(12) United States Patent
Liperoti et al.

(10) Patent No.: US 11,524,444 B2
(45) Date of Patent: Dec. 13, 2022

(54) USE OF DUAL OVENABLE POLYESTER FILMS IN THERMOFORMING PACKAGING APPLICATIONS AND DUAL OVENABLE THERMOFORMED PACKAGES OBTAINED THEREFROM

(71) Applicant: Cryovac, LLC, Charlotte, NC (US)

(72) Inventors: Antonio Liperoti, Origgio (IT); Maurizio Ciocca, Novara (IT); Simona Di Fiore, Terrazzano di Rho (IT); Barbara Giusti, Usmate Velate (IT); Roberto Forloni, Rho (IT)

(73) Assignee: Cryovac, LLC, Charlotte, NC (US)

( * ) Notice: Subject to any disclaimer, the term of this patent is extended or adjusted under 35 U.S.C. 154(b) by 424 days.

(21) Appl. No.: 16/620,953

(22) PCT Filed: Jun. 27, 2018

(86) PCT No.: PCT/EP2018/067291
§ 371 (c)(1),
(2) Date: Dec. 10, 2019

(87) PCT Pub. No.: WO2019/002388
PCT Pub. Date: Jan. 3, 2019

(65) Prior Publication Data
US 2020/0198217 A1    Jun. 25, 2020

(30) Foreign Application Priority Data
Jun. 29, 2017   (EP) .................................... 17178852

(51) Int. Cl.
*B29C 51/14*   (2006.01)
*B29C 51/00*   (2006.01)
(Continued)

(52) U.S. Cl.
CPC ............ *B29C 51/14* (2013.01); *B29C 51/002* (2013.01); *B29C 51/08* (2013.01); *B65D 75/002* (2013.01);
(Continued)

(58) Field of Classification Search
CPC .......... B32B 27/36; B32B 27/08; B32B 1/02; B32B 2307/518; B32B 2439/70; B32B 2307/31; B32B 2307/736; B32B 2307/702; B32B 2307/7242; B65D 75/002; B65D 75/32; B65D 81/343; B65D 81/3446;
(Continued)

(56) References Cited

U.S. PATENT DOCUMENTS

| 3,491,504 A | 1/1970 | Young et al. |
| 3,574,642 A | 4/1971 | Weinke |

(Continued)

FOREIGN PATENT DOCUMENTS

| EP | 372846 A2 | 6/1990 |
| EP | 2722279 A1 | 4/2014 |

(Continued)

*Primary Examiner* — Monica A Huson
(74) *Attorney, Agent, or Firm* — Jason R. Womer

(57) ABSTRACT

The present invention relates to thermoforming food packaging methods and to dual ovenable thermoformed food packages suitable for cooking food products directly in the package in microwave, conventional and convection ovens. These packages are characterized by good hermeticity, clean peelability, self-venting, very good optics and, if shrunk, a very appealing appearance.

20 Claims, 5 Drawing Sheets

(51) Int. Cl.
*B29C 51/08* (2006.01)
*B65D 75/00* (2006.01)
*B65D 75/32* (2006.01)
*B65D 81/34* (2006.01)
*B29K 67/00* (2006.01)
*B29L 31/00* (2006.01)

(52) U.S. Cl.
CPC ......... *B65D 75/32* (2013.01); *B65D 81/343* (2013.01); *B65D 81/3446* (2013.01); *B29K 2067/00* (2013.01); *B29K 2995/0049* (2013.01); *B29K 2995/0053* (2013.01); *B29L 2031/7128* (2013.01)

(58) Field of Classification Search
CPC ....... B29C 51/14; B29C 51/002; B29C 51/08; B29K 2067/00; B29K 2995/0053; B29K 2995/0049; B65B 7/162; B29L 2031/7128
See application file for complete search history.

(56) References Cited

U.S. PATENT DOCUMENTS

| | | | |
|---|---|---|---|
| 3,681,092 | A | 8/1972 | Titchenal et al. |
| 3,713,849 | A | 1/1973 | Grindrod et al. |
| 4,055,672 | A | 10/1977 | Hirsch et al. |
| RE30,009 | E | 5/1979 | Perdue et al. |
| 4,188,443 | A | 2/1980 | Mueller et al. |
| 4,302,565 | A | 11/1981 | Goeke et al. |
| 4,302,566 | A | 11/1981 | Karol et al. |
| 4,841,605 | A | 6/1989 | Schuierer |
| 5,000,991 | A | 3/1991 | Hayashi et al. |
| 5,026,798 | A | 6/1991 | Canich |
| 5,346,735 | A | 9/1994 | Logan et al. |
| 7,569,276 | B2 | 8/2009 | Kendig et al. |
| 8,129,007 | B2 | 3/2012 | Forloni |
| 8,424,273 | B2 | 4/2013 | Bernig et al. |
| 8,697,211 | B2 | 4/2014 | Gkinosatis |
| 9,126,389 | B2 | 9/2015 | Brown |
| 9,126,398 | B2 | 9/2015 | Gray |
| 2005/0074598 | A1 | 4/2005 | Peiffer et al. |
| 2005/0136202 | A1 | 6/2005 | Kendig et al. |
| 2005/0173289 | A1 | 8/2005 | Natterer et al. |
| 2008/0152772 | A1 | 6/2008 | Bemig et al. |
| 2008/0274328 | A1 | 11/2008 | Gkinosatis |
| 2009/0061129 | A1 | 3/2009 | Re Fraschini et al. |
| 2009/0130276 | A1 | 5/2009 | Voisin et al. |
| 2010/0221391 | A1 | 9/2010 | Deng et al. |
| 2010/0224529 | A1 | 9/2010 | Forloni |
| 2013/0055682 | A1 | 3/2013 | Beneddtti et al. |
| 2016/0152390 | A1 | 6/2016 | Itoh et al. |
| 2018/0170595 | A1 | 6/2018 | Palumbo et al. |

FOREIGN PATENT DOCUMENTS

| | | |
|---|---|---|
| FR | 1258357 A | 4/1961 |
| FR | 1286018 A | 3/1962 |
| WO | 199635626 A1 | 11/1996 |
| WO | 2007054698 A2 | 5/2007 |
| WO | 2007093495 A1 | 8/2007 |
| WO | 2009013284 A1 | 1/2009 |
| WO | 2009032627 A2 | 3/2009 |
| WO | 2009141214 A1 | 11/2009 |
| WO | 2012027043 A1 | 3/2012 |
| WO | 2012160142 A1 | 11/2012 |
| WO | 2013080143 A1 | 6/2013 |
| WO | 2015189351 A1 | 12/2015 |

PRODUCT AFTER PACKAGING

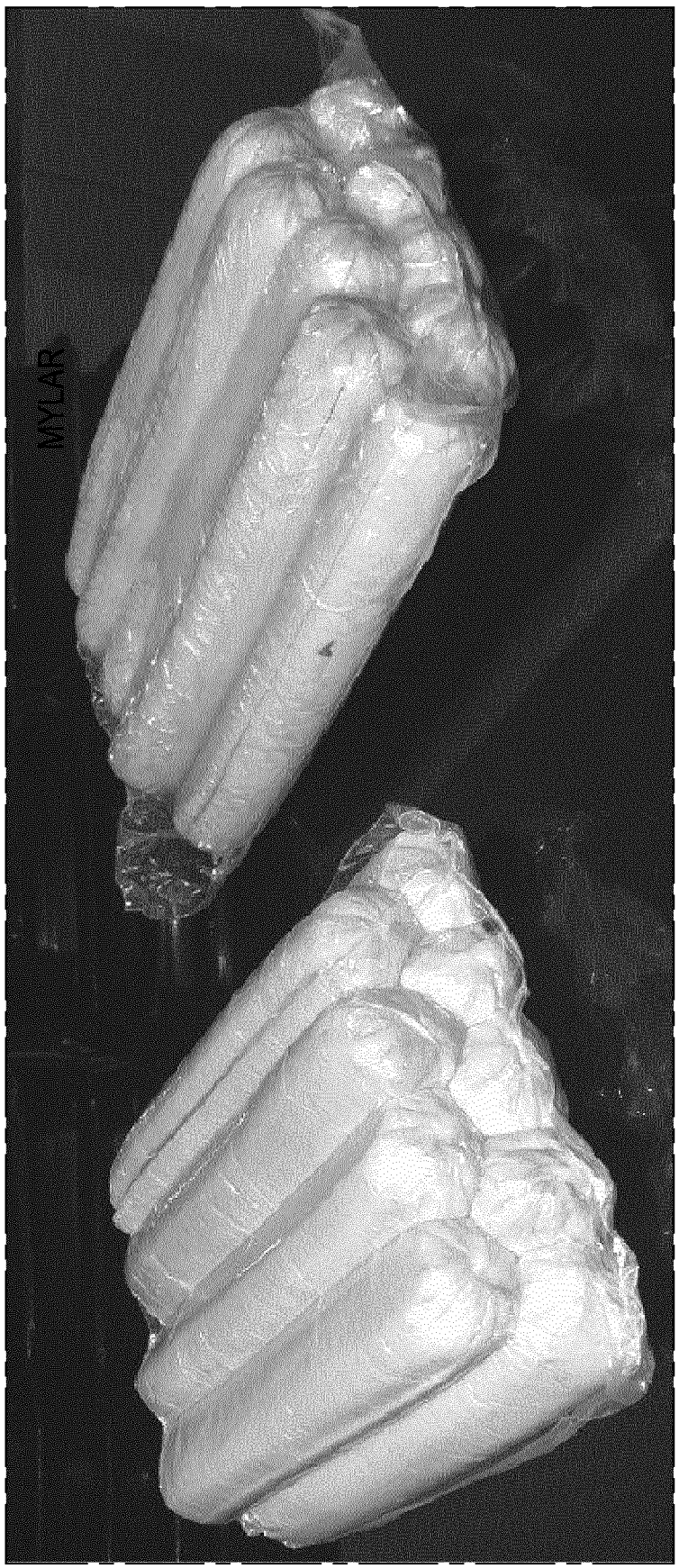

USE OF DUAL OVENABLE POLYESTER FILMS IN THERMOFORMING PACKAGING APPLICATIONS AND DUAL OVENABLE THERMOFORMED PACKAGES OBTAINED THEREFROM

TECHNICAL FIELD

The present invention relates to the use of oriented polyester films in thermoforming food packaging methods, in particular in deep-drawing and in thermoform-shrink food packaging methods. Furthermore, the invention relates to dual ovenable thermoformed packages, in particular to dual ovenable thermoformed food packages for cook-in.

BACKGROUND ART

Cook-in packaging, namely packaging in which food products can be cooked directly in the package, in microwave or conventional ovens, in boiling water or water steam, is becoming increasingly popular since it reduces the time spent in preparing meals, is efficient, does not require cooking skills and allows better portion control.

Additionally, if cooking is done in the intact package, cooking times are generally reduced, the oven remains clean, unpleasant smells are not released and the flavor of the product is retained.

Cook-in methods are particularly desirable in certain specific applications, such as for instance, for cooking fresh fish products since they avoid handling raw fish and reduce the risk of contamination. There are few plastic materials suitable for the most demanding dual ovenable cook-in applications, namely materials that are:

- transparent to microwaves for cooking in microwave oven (microwaveable),
- resistant to temperatures higher than 205° C. and up to 220° C. for high temperature cooking in conventional oven (ovenable),
- able to seal strongly enough to prevent leakage from the package during storage and transportation but at the same time easily peelable, for smooth opening, and self-venting to allow vapors to escape the package during cooking,
- able to provide the food with a sufficiently high core temperature throughout the cooking to kill pathogens and bacteria,
- clear and not whitening during cooking to allow inspection,
- approved by Regulatory Authorities for food contact use, namely not releasing contaminants throughout the processing cycle, including any pre-cooking, packaging, heat-sealing, storage and cooking step.

Materials which in practice, have been mostly developed and used for manufacturing dual ovenable packages, are mainly based on polyesters.

Dual-ovenable packages, disclosed in prior art documents, for instance in WO2007093495, WO2009013284 and WO2012160142 in the name of Cryovac or available in the market, typically include a plastic tray closed with a lidding oriented heat shrinkable polyester film sealed around the flange of the tray (dual ovenable tray lidded packages).

Other dual ovenable packages may comprise a bag or a pouch enclosing a food product, in which said bag or pouch is pre-made according to conventional bag making processes or manufactured in-line, in form-fill-seal processes, from dual ovenable polyester films.

Further dual ovenable packages may comprise a thermoformed flexible container with an opening (e.g. a pouch), manufactured from a dual ovenable polyester film by thermoforming, which encloses a food item and which is closed either by self-sealing the same film at the opening or by sealing a flexible dual ovenable lid all around the opening.

Thermoforming is a manufacturing process where a plastic film is heated to a forming temperature, formed to a specific shape in a mold, cooled and trimmed to create containers, lids, trays, blisters and other products for food, medical and general packaging applications.

Thermoforming is widely applied to the packaging of foodstuff because of the flexibility of the process, the packaging speed and the ease of automation.

Thermoformed containers, such as pouches or trays, may be pre-made before the packaging process or, in alternative, made in-line in a continuous manner in a thermoforming packaging method.

Typically, in a continuous thermoforming packaging method of high-volume, thin-gauge products, a plastic film (bottom web) is fed from a roll into an oven for heating to a forming temperature. The heated film is then brought into a forming station where a mold and a pressure chamber close on the film.

Vacuum is then applied, to remove trapped air and to pull the material into or onto the mold, along with pressurized air to form the plastic to the detailed shape of the mold, thereby forming a plurality of concave containers. Once the containers have been formed from a bottom web, the product to be packaged is loaded in the containers, air is evacuated from the inside and the packages may be then closed by thermal sealing of the upper peripheral portion of each container with a lid (top web), which may be e.g. a non thermoformed film, another thermoformed flexible container, or a stretch film, to thereby produce a plurality of vacuum-packaged products in a continuous manner.

The continuous web containing the closed packages is then transferred into a cutting station, where a die cuts the packages from the remaining web.

The remaining web is typically wound onto a take-up reel or fed into an inline granulator for recycling.

"Deep-drawing" is a particularly demanding thermoforming application, named after the considerably high final depth of the formed container, which is used to shape trays, pouches and similar products.

The film used in deep-drawing must have several attributes to be fit-for-use.

First, it has to be endowed with an exceptionally high formability as the material is subjected to drawings much higher than those of conventional thermoforming.

In fact, in thermoforming a deep cavity, a flat sheet of a definite surface must be able to provide for the much higher surface of the cavity. When the sheet is heated and forced into a deep mold, it is subjected to a significant stretching to conform to the cavity shape. As the sheet stretches, it thins out and it may break.

Further, the film must conform closely to all the details of the mold, keeping a high definition. At the same time, the thermoformed film should not give the so-called "shrink back" effect, namely the formed container, when removed from the mold, should maintain the shape and size given by the mold as much as possible.

The film must also have good mechanical properties so that the end package, where the thickness of the packaging material is reduced by the forming step, still has the necessary abuse resistance.

Known films for deep-drawing are generally characterized by the presence of strengthening layers, preferably polyamide layers such as for instance the laminates shown in WO2005/063483 in the name of Du Pont. These laminates are not suitable for dual-ovenable applications.

Also WO2012027043A1 in the name of Cryovac, discloses a thermoforming process in which the thermoformed films are polyamide-based films.

The resulting packages according to the definition given therein (page 1, lines 17-23), would withstand exposure to both microwaves and conventional heating in oven at temperatures of 375° F. or 400° F. (i.e. 190 or 204° C.). However, due to the presence of lower melting resins especially in the outer abuse layer of the films, they would not be suitable for cooking in oven at temperatures higher than 205° C. and up to 220° C.

A variant of the thermoforming packaging method often used in food packaging is the so-called thermoform-shrink or roll-shrink packaging method. In this application, a thermoplastic heat shrinkable film unwound from a roll is thermoformed in line, loaded with a product, closed and then heat shrunk around the product.

A thermoform-shrink packaging method typically comprises:
heating a bottom web and, with the help of positive or negative air pressure, forcing it to take the shape of the mold;
placing the food to be packaged inside the formed web;
applying vacuum and heat-sealing a top web on the bottom web, so that the package is fully sealed and finally
heat shrinking the package for a better, more appealing presentation.

The top web may be heat shrinkable or not.

The shrinkage of the packaging material of the bottom, of the top or of both the bottom and the top webs induced by a heat-treatment, provides for the desired tight appearance to the end vacuum package. Examples of these packages are those described for instance in EP2030784 in the name of Cryovac, U.S. Pat. No. 8,424,273, US2008/0152772 in the name of CSF and US20050173289 in the name of Multivac. The multilayer heat shrinkable films used therein are not polyester based and are not suitable for dual ovenable applications.

In thermoform-shrink applications, the film is required to have optimal shrink properties, not only before but especially after thermoforming, in order to get a tight package.

Accordingly, once thermoformed, the film must retain a certain free heat shrink in both LD and TD directions and a certain shrink tension to guarantee that, after the shrinking step, the package appearance is as tight as desired.

Additionally, the film should have good optical properties after drawing and shrinkage, not only for purely aesthetical reasons but also to allow the visual inspection of the packaged product.

There are packaging processes known in the literature and recently applied in food industry, that combine deep-drawing followed by shrinking, namely that involve the deep-drawing of an oriented heat-shrinkable film to form a flexible shrinkable container with a deep cavity.

These deep drawing thermoform-shrink packaging methods differ from the conventional deep-drawing methods, in the use of a heat-shrinkable flexible film, instead of a standard, non-heat-shrinkable generally thicker laminate. The main advantages offered by deep drawn thermoform-shrink packaging with heat-shrinkable films reside in the reduced amount of packaging material employed and in the improved pack appearance that makes the product more appealing.

Standard dual ovenable oriented PET materials, which are generally used as lids for tray-lidding or as non-thermoformed pouches, are not suitable as forming webs in thermoforming, especially in deep-drawing, as they are endowed with scarce formability. Furthermore, they are also unsuitable for shrink applications as they have very poor shrink properties.

In the Applicant's knowledge, there are few examples of use of dual ovenable polyester films in standard (i.e. shallow) thermoforming packaging for dual ovenable applications.

For instance, the document WO2015/189351 in the name of Cryovac discloses the use of polyester films in packaging perishable food (e.g. fish) under modified atmosphere to increase the product shelf life and to allow cook-in in the same package. A possible package includes both top and bottom polyester films sealed together and enclosing a food product. The bottom polyester film may be thermoformed. In the examples, the bottom Film 1—which is heat set and no longer shrinkable—is formed at the maximum depth of 1 cm (see Examples 5 and 6, at draw ratios of 1.24 and 1.26 respectively). The packages of these examples do not include any product and are not shrunk.

The document WO2006/002263 in the name of DuPont describes thermoformed pouches for cook-in applications made under standard thermoforming conditions from polyester—polyamide films comprising particular sulfur-containing polyesters. In the Applicant's knowledge, there are even fewer examples of use of polyester films in deep-drawing food packaging for dual ovenable applications.

The document WO2007/054698 in the name of Du Pont describes a method of packaging fish or meat, which comprises thermoforming a dual-ovenable thermoformable polyester receiving film to provide a cavity, placing the product in the cavity and closing the package with a dual ovenable covering film by heat-sealing the two films all around the product.

The co-polyesters used in the thermoformable films have an intrinsic viscosity lower than 0.75 dl/g (see pages 20-21 of the description).

In the examples 1 to 4, dual ovenable polyester films of unknown composition (named Mylar® P25, HFF—FT, HFF—FT3 and HFF—FT7 respectively) are drawn at the depth of 50 mm. These examples provide no information on the shape, the measures of the mold and on draw ratios. The final packages are not subjected to heat shrinking.

These films, compared with the films of the present invention, are less formable as resulted from the comparative Example 1 of the present description.

Furthermore, according to the technical data sheet of Mylar®P25, this film shows a free shrink percentage at 150° C. of 2.5% in LD and 1.5% in TD (ASTM E794), which would not be ideal for thermoform-shrink packaging applications. Accordingly, as shown in the present Example 4, the commercial film named Mylar®0L25 does not perform very well in thermoform-shrink applications, resulting in creased shrunk packages (FIG. 5B)

US20050074598 describes coextruded biaxially oriented polyester films for use in tray lidding comprising a base layer (B) and a heat-sealable top layer (A), those films being characterized by the peculiar composition of the layer (A) that confers heat-sealability and peelability when sealed onto APET/CPET trays. This document does not disclose the use of those films in any thermoforming application. In the Applicant's knowledge, there are no examples of use of polyester films in thermoform-shrink packaging methods for dual ovenable applications.

In conclusion, there is still the need for dual ovenable highly formable polyester films, which are suitable for deep drawing and/or for thermoform-shrink packaging, namely dual ovenable films which form well and withstand high draw ratios in thermoforming, do not shrink back when released from the mold and, when heat-shrinkable, are highly shrinkable after thermoforming, thus providing very tight, appealing shrunk packages.

SUMMARY OF THE INVENTION

The Applicant has surprisingly found that known dual ovenable polyester films, disclosed in the documents WO2012/160142 for use as lids in tray lidding and in WO2015/189351 as non-thermoformed or as shallow thermoformed non shrinkable containers, perform very well in thermoforming packaging applications such as deep-drawing and thermoform-shrink packaging.

The Applicant found out that these films are characterized by an unexpectedly high formability that allows deep drawing even at thicknesses lower than conventional films. Advantageously, using thinner films results in cost savings and improved carbon footprint.

Furthermore, these films, in their heat shrinkable version (i.e. when not heat set) show a surprisingly high shrinking after thermoforming thus providing very tight packages upon shrinking. This is surprising as typically, formability and shrinking are inversely related.

Finally, due to their remarkable thermal resistance, these films may provide for deep-drawn and/or shrunk packages, which are dual ovenable, even at temperatures higher than 205° C. and up to 220° C., which are particularly appreciated for certain cook-in applications.

Accordingly, a first object of the present invention is a thermoforming food packaging method, for the manufacture of a dual ovenable thermoformed package, which comprises
    providing a thermoformable dual ovenable biaxially oriented polyester film as bottom web,
    forming the bottom web thus providing at least a cavity with an opening;
    placing a food product in the cavity through the opening;
    closing the cavity at the opening either by hermetically sealing the bottom web to itself or by providing a dual ovenable top web and hermetically sealing the dual ovenable top web to the bottom web, all around the opening; and
    cutting out the sealed package,
    characterized in that the bottom web comprises:
    an outer heat sealable polyester layer a),
    an inner polyester base layer b), comprising a polyester having an intrinsic viscosity (IV) measured according to ASTM D4603-03 higher than 0.75 dl/g,
    an outer polyester layer c), and
    i) the bottom web is formed at a draw ratio higher than 1.26 or
    ii) the bottom web is heat-shrinkable and the sealed package is finally heat-shrunk.

A second object according to the present invention is a dual ovenable thermoformed flexible container, comprising a thermoformed cavity and an opening, made by thermoforming the film of the bottom web described above, in which the depth of the thermoformed cavity is higher than 1 cm and/or the thermoformed container is heat-shrinkable.

A third object according to the present invention is a dual ovenable hermetic thermoformed package comprising
    a dual ovenable thermoformed flexible container according to the second object, comprising a thermoformed cavity and an opening,
    a food product placed in the cavity,
    said opening being hermetically closed by the flexible container self-sealed at the opening or by a dual ovenable top web sealed to the container all around the opening.

A fourth object of the present invention is a method for cooking a food product, which comprises
    providing the dual ovenable thermoformed package enclosing said product, according to the third embodiment described above, and
    cooking the packaged food in said package in a microwave or conventional oven.

BRIEF DESCRIPTION OF THE DRAWINGS

FIG. 5 is a picture of the same sausages thermoformed packages of FIG. 4 but after shrinking (according to the invention FIG. 5A, left and comparative FIG. 5B, right).

DEFINITIONS

Figure 1:
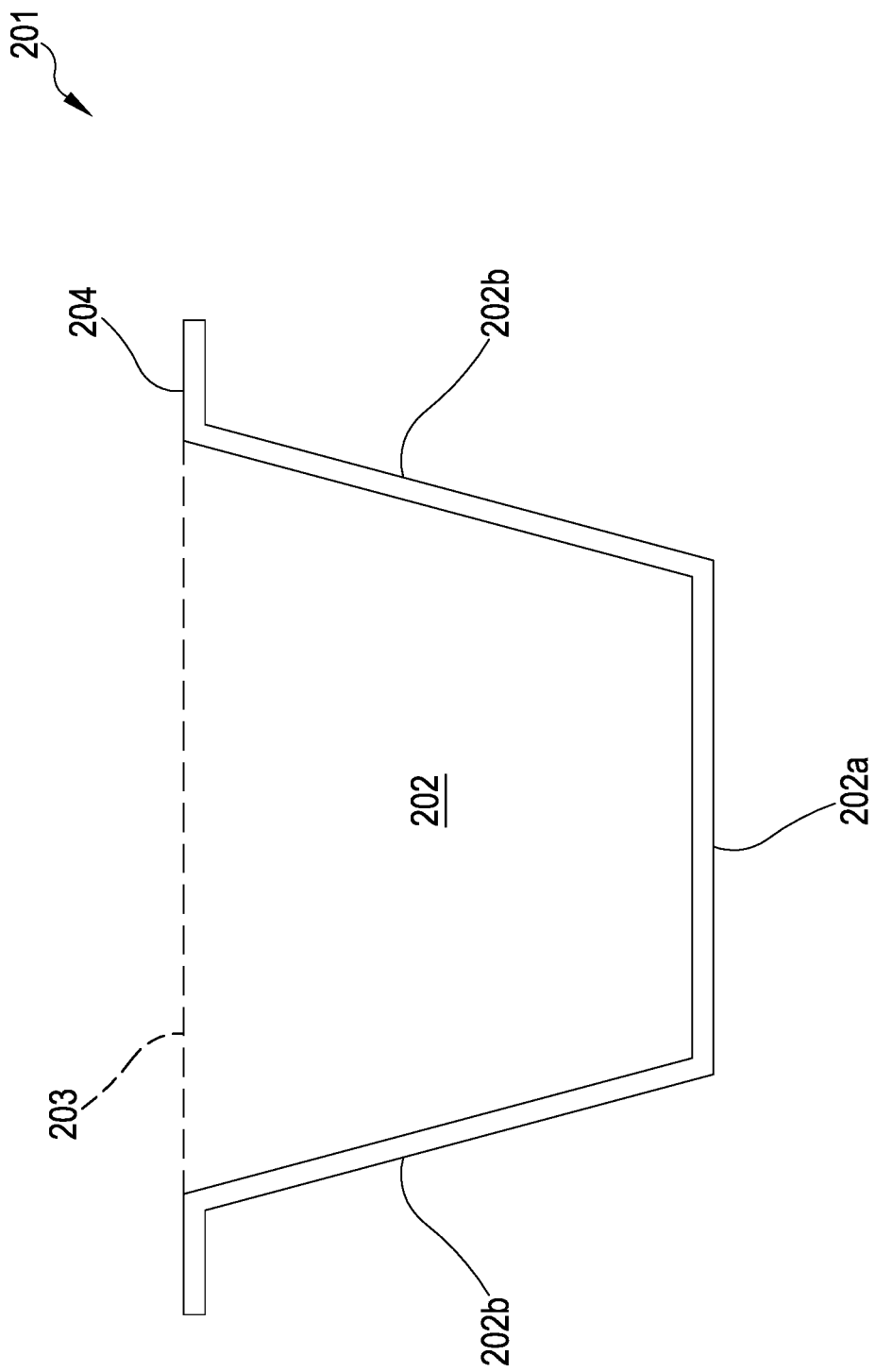
FIG. 1 shows a cross-section of a deep-drawn container (201) according to the invention.

As used herein, the term "film" refers to a plastic web, regardless of whether it is film or sheet or tubing.

As used herein, the terms "inner layer" and "internal layer" refer to any film layer having both of its principal surfaces directly adhered to another layer of the film.

As used herein, the phrase "outer layer" or "external layer" refers to any film layer having only one of its principal surfaces directly adhered to another layer of the film.

As used herein, the phrases "seal layer", "sealing layer" and "sealant layer", refer to an outer layer involved in the sealing of the film to itself, to another layer of the same or another film.

As used herein, the term "base layer" refers to the layer, which in terms of thickness represents the highest portion of the film, in particular to a layer of the film whose thickness is at least 40%, preferably at least 50%, more preferably at least 60% of the film total thickness.

As used herein, the term "adhered" refers to film layers having a principal surface directly or indirectly (via one or more additional layers between them) in contact with one another via coextrusion, extrusion coating, or lamination via adhesive.

As used herein, film layers, which are "directly adhered", have a principal surface in direct contact with one another, without an adhesive or other layer between them.

As used herein, the term "polymer" refers to the product of a polymerization reaction, and is inclusive of homopolymers, and copolymers.

As used herein, the term "homopolymer" is used with reference to a polymer resulting from the polymerization of a single monomer, i.e., a polymer consisting essentially of a single type of mer, i.e., repeating unit.

As used herein, the term "copolymer" refers to polymers formed by the polymerization reaction of at least two different monomers. For example, the term "copolymer" includes the copolymerization reaction product of ethylene and an alfa-olefin, such as 1-hexene. When used in generic terms the term "copolymer" is also inclusive of, for example, ter-polymers. The term "copolymer" is also inclusive of random copolymers, block copolymers, and graft copolymers.

As used herein, the term "polyolefin" refers to any polymerized olefin, which can be linear, branched, cyclic, aliphatic, aromatic, substituted, or unsubstituted. Polyolefin includes olefin homopolymer, olefin copolymer, copolymer of an olefin and an non-olefinic co-monomer co-polymerizable with the olefin, such as vinyl monomers, modified polymers thereof, and the like. Specific examples include ethylene homopolymer, propylene homopolymer, butene homopolymer, ethylene' s a-olefin copolymer, and the like, propylene/a-olefin copolymer, butene/a-olefin copolymer, ethylene/unsaturated ester copolymer (e.g. ethylene/ethyl acrylate copolymer, ethylene/butyl acrylate copolymer, ethylene/methyl acrylate copolymer), ethylene/unsaturated acid copolymer (e.g., ethylene/acrylic acid copolymer, ethylene/methacrylic acid copolymer), ethylene/vinyl acetate copolymer, ionomer resin, polymethylpentene, etc.

As used herein, the phrase "ethylene/alfa-olefin copolymer" refers to heterogeneous and to homogeneous polymers such as linear low density polyethylene (LLDPE) with a density usually in the range of from about 0.900 g/cm$^3$ to about 0.930 g/cm$^3$, linear medium density polyethylene (LMDPE) with a density usually in the range of from about 0.930 g/cm$^3$ to about 0.945 g/cm$^3$, and very low and ultra low density polyethylene (VLDPE and ULDPE) with a density lower than about 0.915 g/cm$^3$, typically in the range 0.868 to 0.915 g/cm$^3$, and such as metallocene-catalyzed Exact® and Exceed® homogeneous resins obtainable from Exxon, single-site Affinity® resins obtainable from Dow, and Tafmer® homogeneous ethylene/a-olefin copolymer resins obtainable from Mitsui. All these materials generally include copolymers of ethylene with one or more comonomers selected from C4-10 alpha-olefin such as butene-1, hexene-1, octene-1, etc., in which the molecules of the copolymers comprise long chains with relatively few side chain branches or cross-linked structures.

As used herein, the phrase "heterogeneous polymer" or "polymer obtained by heterogeneous catalysis" refers to polymerization reaction products of relatively wide variation in molecular weight and relatively wide variation in composition distribution, i.e., typical polymers prepared, for example, using conventional Ziegler-Natta catalysts, for example, metal halides activated by an organometallic catalyst, i.e., titanium chloride, optionally containing magnesium chloride, complexed to trialkyl aluminum and may be found in patents such as U.S. Pat. No. 4,302,565 to Goeke et al. and U.S. Pat. No. 4,302,566 to Karol, et al. Heterogeneous catalyzed copolymers of ethylene and an alpha-olefin may include linear low-density polyethylene (LLDPE), very low-density polyethylene (VLDPE) and ultra low-density polyethylene (ULDPE). Some copolymers of this type are available from, for example, The Dow Chemical Company, of Midland, Mich., U.S.A. and sold under the trademark Dowlex® resins.

As used herein, the phrase "homogeneous polymer" or "polymer obtained by homogeneous catalysis" or "single site catalyzed (ssc) polymer" refers to polymerization reaction products of relatively narrow molecular weight distribution and relatively narrow composition distribution. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. This term includes those homogeneous polymers prepared using metallocenes, or other single-site type catalysts (ssc), as well as those homogenous polymers that are obtained using Ziegler-Natta type catalysts in homogenous catalysis conditions. The copolymerization of ethylene and alpha-olefins under homogeneous catalysis includes, for example, copolymerization with metallocene catalysis systems, which include constrained geometry catalysts, i.e., monocyclopentadienyl transition-metal complexes, is described in U.S. Pat. No. 5,026,798 to Canich.

Homogeneous ethylene/alfa-olefin copolymer (homogeneous EAO) includes modified or unmodified linear homogeneous ethylene/alpha-olefin copolymers marketed as Tafmer® resins by Mitsui Petrochemical Corporation of Tokyo, Japan, and modified or unmodified linear homogeneous ethylene/a-olefin copolymers marketed as Exact® resins by ExxonMobil Chemical Company of Houston, Tex., U.S.A. and modified or unmodified homogeneous ethylene/alpha-olefin copolymers having a long-chain branching marketed as Affinity® brand resins by The Dow Chemical Company. As used herein, a "long-chain branched" ethylene/alpha-olefin copolymer refers to copolymer having branches with a length comparable to the length of the main polymer chain. Long chain branched ethylene/alpha-olefin copolymer has an I10/I2 ratio (namely the ratio of melt indices at 10 kg and 2.16 kg) of at least 6, or at least 7, or from 8 to 16.

As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith.

Preferably, such modified polymers have the anhydride functionality grafted on or polymerized therewith, as opposed to merely blended therewith.

As used herein, the phrase "anhydride-containing polymer" and "anhydride-modified polymer" refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the term "modified polyolefin" is inclusive of modified polymers prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It is also inclusive of modified polymers obtained by incorporating an unsaturated carboxylic acid, e.g., maleic acid, fumaric acid or the like, or a derivative thereof such as the anhydride, ester or metal salt or the like, into the olefin homopolymer or copolymer, by blending with or grafting to the polymer chain.

Ethylene-unsaturated acid polymers include homopolymers and copolymers having an acrylic acid and/or a methacrylic acid linkage between monomer units. Acrylic acid-based resins may be formed by any method known to those skilled in the art and may include polymerization of acrylic acid or methacrylic acid in the presence of light, heat, or catalysts such as benzoyl peroxides, or by the esters of these acids, followed by saponification. Examples of acrylic acid-based resins include, but are not limited to, ethylene/acrylic acid copolymer (EAA), ethylene/methacrylic acid copolymer (E/AA), and blends thereof.

Ethylene-unsaturated ester polymers include homopolymers and copolymers having an ester of acrylic acid linkage between the monomer units. Acrylate-based resins may be formed by any method known to those skilled in the art, such as, for example, polymerization of the acrylate monomer by the same methods as those described for acrylic acid-based resins. Examples of acrylate-based resin include, but are not limited to, methyl/methacrylate copolymer (MMA), ethylene/vinyl acrylate copolymer (EVA), ethylene/methacrylate copolymer (EMA), ethylene/n-butyl acrylate copolymer (EnBA), and blends thereof.

As used herein, the phrase "ethylene/vinyl acetate" (EVA) refers to a copolymer formed from ethylene and vinyl acetate monomers wherein the ethylene units are present in a major amount and the vinyl-acetate units are present in a minor amount. The typical amount of vinyl-acetate may range from about 5 to about 20 weight %. As used herein the term "ionomer resin" refers to a copolymer based on metal salts of copolymers of ethylene and a vinyl monomer with an acid group, such as methacrylic acid, and are cross-linked polymers in which the linkages are ionic (i.e., interchain ionic bonding) as well as covalent bonds. Lonomer resins have positively and negatively charged groups, which are not associated with each other, providing the resin with a polar character. The metal can be in the form of a monovalent or divalent ion such as lithium, sodium, potassium, calcium, magnesium and zinc. Unsaturated organic acids include acrylic acid and methacrylic acid. Unsaturated organic ester includes methacrylate and isobutyl acrylate. Lonomer resin can include a mixture of two or more ethylene/unsaturated organic acid or ester copolymers. As used herein, the term "polyester" refers in general to homopolymers or copolymers having an ester linkage between monomer units, which may be formed, for example, by condensation polymerization reactions between a dicarboxylic acid and glycol. The term "polyester" refers to both homo- and co-polyesters, wherein homo-polyester are defined as polymers obtained from the condensation of one dicarboxylic acid with one diol and co-polyesters are defined as polymers obtained from the condensation of one or more dicarboxylic acids with one or more diols. The ester monomer unit may be represented by the general chemical formula: R—C(O)O—R' where R and R'=an alkyl group and may be generally formed from the polymerization of dicarboxylic acid and diol monomers or monomers containing both carboxylic acid and hydroxy moieties. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl-substituted aromatic acids, i.e., various isomers of phthalic acid, such as paraphthalic acid (or terephthalic acid), isophthalic acid and naphthalic acid. Specific examples of alkyl-substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. The polyalkyl terephthalates are aromatic esters having a benzene ring with ester linkages at the 1,4-carbons of the benzene ring as compared to polyalkyl isophthalates, where two ester linkages are present at the 1,3-carbons of the benzene ring. In contrast, polyalkyl naphthalates are aromatic esters having two fused benzene rings where the two ester linkages may be present at the 2,3-carbons or the 1,6-carbons.

As used herein, unless otherwise stated, the term "polyester layer, film or container" refers to a layer, to a film or to a container comprising a major proportion of polyester, namely comprising more than 50%, preferably more than 60%, 70%, 80%, 90% by weight of a polyester with respect to the layer or film weight respectively.

As used herein, the intrinsic viscosity (IV) is defined as the limiting value of the reduced viscosity at infinite dilution of the polymer and is determined using a capillary viscometer. A suitable method for the determination of the intrinsic viscosity is ASTM method D4603-03.

As used herein, the term "major proportion" of a resin in a layer in a film or in a container means that more than 50% by weight of said resin is present in said layer, film or container.

As used herein, the term "minor proportion" of a resin in a layer in a film or in a container means that less than 50% by weight of said resin is present in said layer, film or container.

As used herein, the term "thermoformed flexible container" refers to thermoformed flexible pouches with an opening for loading the product to be packaged.

As used herein, the phrases "machine direction", herein abbreviated "MD," and "longitudinal direction", herein abbreviated "LD", refer to a direction "along the length" of the film, i.e., in the direction of the extrusion of the film.

As used herein, the phrase "transverse direction", herein abbreviated "TD", refers to a direction across the film, perpendicular to the machine or longitudinal direction. As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching.

As used herein, the term "oriented" refers to a thermoplastic web, which has been elongated, at a temperature above the softening temperature, in either one direction ("uniaxial") or two directions ("biaxial"), followed by cooling the film to "set" it while substantially retaining the elongated dimensions. Solid-state orientation at a temperature above the softening point produces a film exhibiting heat shrink character upon subsequent heating. Orientation in the melt state, as in the production of a blown film, does not result in a heat shrinkable film. Orientation in both the melt state and the solid state increases the degree of alignment of the polymer chains, thereby enhancing the mechanical properties of the resulting oriented film.

As used herein, the term "vacuum forming" is a thermoforming process in which air is evacuated from the sealed space between the hot sheet and the mold, thus allowing atmospheric pressure to force the sheet to conform to the contour of the mold.

As used herein, the term "standard thermoforming or shallow thermoforming" refers to thermoforming characterized by low drawing ratios, namely lower than 1.26, which provide for shallow cavities.

As used herein "deep-drawing or deep draw thermoforming" refer in general to the thermoforming of thermoplastic materials characterized by a draw-ratio higher than 1.26, preferably higher than 2.0, 2.5, 3.0, 3.5, 4.0 or 4.5, which provides for deep cavities.

As used herein the term "thermoformable" defines a material which may be "thermoformed" under exposure to heat on a suitable apparatus, i.e. may be shaped under exposure to pressure and/or vacuum. The material has thermoplastic properties, such that it is deformable when heated but exhibits sufficient dimensional stability at room temperature, so that the shape predetermined by thermoforming is retained.

As used herein the term "deep-drawable" defines a material which may be drawn at a draw ratio higher than 1.26, preferably higher than 2.0, more preferably higher than 2.5, 3.0, 3.5, 4.0 or 4.5.

As used herein, the term "thermoforming draw ratio" (DR) refers to the draw ratio calculated on the mold, in particular to the ratio between the total surface area of the mold and the footprint of the same.

As used herein, the term "actual thermoforming draw ratio" (a-DR) refers to the actual ratio the film is stretched to under thermoforming. The actual draw ratio may be calculated on the real dimensions of the thermoformed container.

As used herein, the term "cavity" refers to an indented portion obtainable by thermoforming a thermoplastic material surrounded by a raised outer or peripheral portion.

As used herein, the terms "heat-shrinkable," "heat-shrink," and the like, refer to the tendency of the film to shrink upon the application of heat, i.e., to contract upon being heated, such that the size of the film decreases while the film is in an unrestrained state. The free shrink is the percent dimensional change in a 12 cm×12 cm specimen of film when subjected to heating in oven at 180° C. for 5 minutes, as explained in the present test methods section.

As used herein, the terms "heat shrinkability" or "% free shrink", unless otherwise stated, refer to the shrink properties of the film before thermoforming.

As used herein, the term "non-heat-shrinkable" refers to a film characterized by a total free shrink percentage (i.e. the sum of free shrink percentage in LD and TD directions) lower than 5% measured in oven at 180° C. according to the test method reported in the experimental part.

As used herein the term "microwaveable", refers to those structures that are "substantially microwave transparent" as well as those that are "microwave active". While substantially microwave-transparent are those capable of being crossed by at least 80%, preferably at least 90% of the microwaves generated by a microwave oven without any sort of interference therewith, the microwave-active are those that incorporate microwave reflective components intended to modify the energy deposition within the adjacent foodstuff. To be "microwaveable" in both cases, under the conditions of use, the packaging material should not be degraded or deformed and it should not release more than 60 ppm of global contaminants to the packaged food in contact therewith. In practice, packaging materials that withstand a heat treatment at 121° C. for 30 min (conditions that are drastic enough not to be reached normally in microwave cooking) without deforming and releasing less than 60 ppm of contaminants, are considered to be "microwaveable" according to most of the food laws.

As used herein the term "dual ovenable" refers to a film or to a package suitable for both microwave and conventional oven cooking, which is able to withstand cooking temperatures higher than 205° C. and up to 220° C.

Unless otherwise stated, in the present description all the percentages are percentages by weight.

DETAILED DESCRIPTION OF THE INVENTION

A first object of the present invention is a thermoforming food packaging method, for the manufacture of a dual ovenable thermoformed package, which comprises
    providing a thermoformable dual ovenable biaxially oriented polyester film as bottom web,
    forming the bottom web thus providing at least a cavity with an opening;
    placing a food product in the cavity through the opening;
    closing the cavity at the opening either by hermetically sealing the bottom web to itself or by providing a dual ovenable top web and hermetically sealing the dual ovenable top web to the bottom web, all around the opening; and
    cutting out the sealed package,
    characterized in that the bottom web comprises:
    an outer heat sealable polyester layer a),
    an inner polyester base layer b), comprising a polyester having an intrinsic viscosity (IV) measured according to ASTM D4603-03 higher than 0.75 dl/g,
    an outer polyester layer c), and
    i) the bottom web is formed at a draw ratio higher than 1.26 or
    ii) the bottom web is heat-shrinkable and the sealed package is finally heat-shrunk.

The outer heat sealable polyester layer a) of the film comprises at least 80%, preferably at least 85% by weight with respect to the layer weight, of one or more polyesters.

The composition of the heat sealable polyester layer a) may vary to a certain extent providing that it seals to polyester materials at temperatures lower than the melting temperatures of the resins of the base layer b) and of the outer layer c).

The seal must be strong enough to prevent leakage of the package during storage and transportation but at the same time it must allow self-venting during cooking and easy opening of the package after cooking by the final consumer.

Suitable heat sealable polyester compositions for layer a) are known and are described, for instance, in WO2007093495 or in WO2012160142.

In one embodiment, according to WO2007093495, the polyester(s) of the heat sealable layer a) may be an amorphous polyesters or a crystalline polyester having a melting temperature not higher than the melting temperature of the polyester of the base layer b) or admixtures thereof.

The term "crystalline" is used herein to indicate that the resin has a definite melting temperature.

The heat-sealable layer a) may comprise an amorphous co-polyester resin or a crystalline co-polyester resin having a melting temperature lower than the melting temperature of the polyester of the base layer b).

As polyester resins for the heat-sealable layer a), co-polyester resins derived from one or more dicarboxylic acid(s) or their lower alkyl (up to 14 carbon atoms) diesters with one or more glycol(s), particularly an aliphatic or cycloaliphatic glycol may be used.

Suitable dicarboxylic acids include aromatic dicarboxylic acids such as terephthalic acid, isophthalic acid, phthalic acid, or 2, 5-, 2, 6- or 2, 7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol.

In one embodiment, according to WO2007093495, the heat sealable layer a) comprises a crystalline co-polyester.

With crystalline co-polyester, a co-polyester having at least a distinct melting peak in a differential scanning calorimetry (DSC) thermogram is meant. The melting point of the resins can be measured by using the DSC technique according to ASTM D 3418.

Preferably, the crystalline co-polyester of the heat-sealable layer comprises an aromatic dicarboxylic acid and an aliphatic dicarboxylic acid. A preferred aromatic dicarboxylic acid is terephthalic acid. Preferred aliphatic dicarboxylic acids are selected from sebacic acid, adipic acid and azelaic acid. The concentration of the aromatic dicarboxylic acid present in the co-polyester is preferably in the range from 45 to 80, more preferably 50 to 70, and particularly 55 to 65 mole % based on the di-carboxylic acid components of the co-polyester. The concentration of the aliphatic di-carboxylic acid present in the co-polyester is preferably in the range from 20 to 55, more preferably 30 to 50, and particularly 35 to 45 mole % based on the dicarboxylic acid components of the co-polyester. Particularly preferred examples of suitable co-polyesters are (i) co-polyesters of azelaic acid and terephthalic acid with an aliphatic glycol, preferably ethylene glycol; (ii) co-polyesters of adipic acid and terephthalic acid with an aliphatic glycol, preferably ethylene glycol; and (iii) co-polyesters of sebacic acid and terephthalic acid with an aliphatic glycol, preferably butylene glycol. Preferred co-polyesters include a co-polyester of sebacic acid/terephthalic acid/butylene glycol having a melting point Tm of 117° C., and a co-polyester of azelaic acid/terephthalic acid/ethylene glycol having a Tm of 150° C.

In one embodiment, according to WO2007093495, the co-polyester of the heat-sealable layer a) is derived from an aliphatic diol and a plurality of aromatic dicarboxylic acids, particularly terephthalic acid and isophthalic acid. A preferred co-polyester is derived from ethylene glycol, terephthalic acid and isophthalic acid. The preferred molar ratios of the terephthalic acid component to the isophthalic acid component are in the range of from 50:50 to 90:10, preferably in the range from 65:35 to 85:15.

In one embodiment, according to WO2007093495, the heat-sealable layer a) comprises an amorphous co-polyester.

Suitable amorphous co-polyesters are those derived from an aliphatic diol and a cycloaliphatic diol with one or more, dicarboxylic acid(s), preferably an aromatic dicarboxylic acid. Typical polyesters which provide satisfactory heat-sealable properties include co-polyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65. An example of such a co-polyester is PETG Eastar 96763 sold by Eastman, which comprises a co-polyester of terephthalic acid, about 33 mole % 1,4-cydohexane dimethanol and about 67 mole % ethylene glycol and which has a glass transition temperature Tg of 81° C.

To reduce the sealing strength, thereby facilitating the opening of the package, it may be convenient to blend the one or more polyester resins of the heat-sealable outer layer a) with 3 to 40% by weight, 5 to 30% by weight, preferably 15 to 25% by weight of an appropriate thermoplastic resin. Suitable thermoplastic resins that contribute to lowering the sealing strength without impairing the optical properties of the film are polyamides, polystyrenes, in particular styrene-butadiene block copolymers, ionomers, ethylene/unsaturated carboxylic acid copolymers, like ethylene/(meth) acrylic acid copolymers, ethylene/unsaturated esters copolymers, like ethylene/vinyl acetate copolymers, maleic anhydride-modified polyethylenes, ethylene/propylene copolymers and ethylene/cyclic olefin copolymers, like ethylene/norbornene copolymers.

A good balance between hermeticity of the seal and ease of removal of the film on opening the package can be obtained by blending an amorphous co-polyester with 3 to 40% by weight of an ethylene/acrylic acid copolymer or of an ethylene/propylene copolymer or of maleic anhydride-modified polyethylenes. Good results may be obtained by blending PET with 3 to 40% by weight of a polyamide. Suitable polyamides are for instance polyamide 6, polyamide 66, and co-polyamides including co-polyamide 6/9, co-polyamide 6/10, co-polyamide 6/12, co-polyamide 6/66, co-polyamide 6/69, and aromatic polyamides and co-polyamides, such as 6I, 6I/6T, MXD6, MXD6/MXDI.

Blends of an amorphous co-polyester with 3 to 40% by weight of an ethylene/acrylic acid copolymer are particularly suitable in packaging applications, which require heat-treatment, like pasteurization, as they provide the best balance between ease of opening and hermeticity of the package. An example of a suitable amorphous polyester is PETG Eastar® 6763 sold by Eastman.

According to WO2012160142, when heating or cooking in conventional oven at higher temperatures is required, the heat sealable layer a) comprises—in addition to from about 25% to 70% by weight of at least a first amorphous polyester having a melting temperature not higher than the melting temperature of the polyester of the base layer b) and from 10% to 20% by weight of at least a thermoplastic resin
  also from 20% to 60% by weight of at least a further polyester resin (ternary blend).

Suitable amorphous polyester resins are those deriving from an aliphatic diol and a cycloaliphatic diol with one or more dicarboxylic acids, preferably an aromatic dicarboxylic acid. Preferably, said amorphous polyester is selected among those deriving from an aliphatic diol and a cycloaliphatic diol with one dicarboxylic aromatic acid, more preferably with terephthalic acid. Preferred amorphous polyesters are co-polyesters of terephthalic acid with an aliphatic diol and a cycloaliphatic diol, particularly ethylene glycol and 1,4-dicyclohexanedimethanol.

The preferred molar ratios of the cycloaliphatic diol to the aliphatic diol are in the range from 10:90 to 60:40, preferably in the range from 20:80 to 40:60, more preferably from 30:70 to 35:65. A specific example of particularly preferred amorphous polyester is PETG Eastar® 6763, sold by Eastman, which comprises a co-polyester of terephthalic acid, about 33 mole % 1,4-cyclohexanedimethanol and about 67 mole % ethylene glycol.

In a particularly preferred embodiment, the amorphous polyester resin in the heat-sealable layer is the same polyester resin used in the base layer.

Suitable thermoplastic resins are polyamides, polystyrenes, in particular styrene-butadiene block copolymers, polyethylenes, ionomers, ethylene/unsaturated carboxylic acid copolymers, such as ethylene/(meth)acrylic acid copolymers, ethylene/unsaturated esters copolymers, such as ethylene/vinyl acetate copolymers, ethylene/propylene copolymers, maleic anhydride-modified polyethylenes such as mod-LLDPE and ethylene/cyclic olefin copolymers, such as ethylene/norbornene copolymers. Ethylene/(meth)acrylic acid copolymers and modified-LLDPE are preferred. Specific examples of particularly preferred thermoplastic resins are Primacor 3440, sold by Dow, which is an ethylene/acrylic acid copolymer with a co-monomer content acrylic acid 9.7%, BYNEL 4104 (2006) by DuPont, a Maleic Anhydride-Modified Ethylene/Butene Copolymer and a modified LLDPE.

Suitable further polyesters are those deriving from one or more aliphatic diols, preferably ethylene glycol and/or cyclohexandimethanols, and an aromatic dicarboxylic acid, preferably terephthalic acid. Suitable further polyesters are preferably characterized by an intrinsic viscosity of at least 0.75 dl/g or higher and/or by a glass transition temperature Tg not higher than 80° C. and/or a melting point higher than 240° C. A suitable method for the determination of the intrinsic viscosity is ASTM method D4603-03. A suitable method for the determination of the glass transition temperature is for instance ASTM method D-3418. A suitable method for the determination of the melting point is for instance ASTM method D3418.

Polyethylene terephthalate (PET) is preferred. Specific examples of further polyesters are the PET named Eastapak co-polyester 9921, sold by Eastman Chemical or RAMA-PET N180 by Indorama Polyester.

The amount of the first amorphous polyester in the heat-sealable layer of the multilayer film according to the present invention is generally from 25% to 70% by weight with respect to the total weight of the heat-sealable layer, preferably from 40 to 60% by weight. Specific preferred amounts are about 40%, and about 60% by weight.

The amount of thermoplastic resin in the heat-sealable layer of the multilayer film according to the present invention is generally from 10% to 20% by weight with respect to the total weight of the heat-sealable layer, preferably about 15% by weight.

The amount of the further polyester in the heat-sealable layer of the multilayer film according to the present invention is generally from 20% to 60% by weight with respect to the total weight of the heat-sealable layer, preferably from 25 to 50%. Specific preferred amounts are about 25%, about 45%, and about 60% by weight. In a preferred embodiment, the heat-sealable layer a) comprises from about 25 to 70% by weight of the amorphous polyester, from 10 to 20% by weight of the thermoplastic resin and from 20% to 60% by weight of the further polyester.

In a particularly preferred embodiment, the heat sealable layer a) comprises from about 40 to 60% by weight of the first amorphous polyester, from 25 to 50% by weight of the further polyester and from 10 to 20% by weight of the thermoplastic resin.

Specific examples of the blends of at least an amorphous polyester, at least a thermoplastic resin and at least a further polyester in the heat-sealable layer a) are:
i) first amorphous polyester 60%; thermoplastic resin 15%; further polyester 25%;
ii) first amorphous polyester 40%; thermoplastic resin 15%; further polyester 45%; and
iii) first amorphous polyester 25%; thermoplastic resin 15%; further polyester 60%.

A particularly preferred ternary blend for layer a) consists of 60% of a PETG, 15% of a modified LLDPE and 25% of a PET.

Another particularly preferred ternary blend for layer a) consists of 60% wt of a PETG, 15% of an ethylene/acrylic acid copolymer and 25% of a PET.

Preferably the thickness of the sealing layer (a) is from 0.5 to 25 microns, preferably from 1 to 20 microns, more preferably from 1 to 15 microns, even more preferably from 2 to 10 microns.

The thickness percentage ratio of the heat sealable polyester layer a) to the film total thickness is generally from 2 to 30%, preferably from 3 to 25% or from 6 to 20%.

The thickness percentage ratio of the heat sealable polyester layer a) to the film total thickness is generally lower than 30%, than 25%, than 20%, than 15% or than 10%.

The inner polyester base layer b) of the films used in the present invention comprises at least a polyester having an intrinsic viscosity measured according to ASTM D4603-03 higher than 0.75 dl/g.

Preferably, the base layer of the film comprises a polyester having an intrinsic viscosity higher than 0.78, more preferably of at least 0.80 dl/g.

The polyester resin used as the starting material for the base layer b) may also have an intrinsic viscosity lower than 0.75 dl/g provided that its intrinsic viscosity after extrusion is higher than this value. For instance, the intrinsic viscosity of the polyester resin could be increased during the extrusion process by means of suitable additives, like so-called "chain extenders". Suitable chain-extenders are for instance those described in EP372846.

Suitable polyester resins are, for instance, polyesters of ethylene glycol and terephthalic acid, i.e. poly(ethylene terephthalate) (PET). Preference is given to polyesters, which contain ethylene units and include, based on the dicarboxylate units, at least 90 mol %, more preferably at least 95 mol %, of terephthalate units. The remaining monomer units are selected from other dicarboxylic acids or diols. Suitable other aromatic dicarboxylic acids are preferably isophthalic acid, phthalic acid, 2, 5-, 2, 6- or 2, 7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the (C3-C19) alkanedioic acids are particularly suitable, in particular succinic acid, sebacic acid, adipic acid, azelaic acid, suberic acid or pimelic acid.

Suitable other aliphatic diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cydohexanedimethanol and 1,4-cydohexane diol, optionally heteroatom-containing diols having one or more rings.

Mixtures or blends of homo- and/or co-polyesters can be used for the base layer b) provided the polyester having an IV higher than 0.75 dl/g represents the major proportion of the base layer. The base layer b) comprises higher than 50%, preferably higher than 60%, 70%, 80%, 85%, 90% or 95% by weight of a polyester having an IV higher than 0.75 dl/g, based on the total weight of the base layer. Any homo- and/or co-polyester can be blended with the polyester resin having an IV higher than 0.75 dl/g in the base layer b).

Preferably, the base layer comprises higher than 50%, 60%, 70%, 80%, 85%, 90%, or 95% by weight of a PET having an IV of at least 0.80 dl/g.

Examples of polyesters suitable for layer b) are PET 9921W® sold by Voridian, RAMAPET N180, Indorama which have a melting point Tm of 245° C. and an IV of 0.80 dl/g or EASTAPAK 9921 by Eastman Chemical having a Tm of 238° C. and an I.V. of 0.8 dl/g.

Suitable mixtures for the base layer b) may comprise at least 50%, 60%, 70%, 80%, 85%, 90%, 95% of the polyester resin having an IV higher than 0.75 dl/g and not more than 50%, 40%, 30%, 20%, 15%, 10%, 5% of an amorphous polyester resin. The amorphous polyester used in the base layer may be the same as or different from the one used in the heat-sealable layer.

Suitable amorphous polyester resins for use in the base layer are co-polyesters of terephthalic acid with an aliphatic diol and a cycloaliphatic diol, especially ethylene glycol and 1,4-cydohexanedimethanol, like the PETG Eastar 6763 sold by Eastman Chemical.

Suitable base layers b) comprise at least 50%, 60%, 70%. 80%, 85%, 90%, 95% of the polyester resin having an IV higher than 0.75 dl/g and not more than 50%, 40%, 30%, 20%, 15%, 10%, 5% of an amorphous polyester of terephthalic acid with ethylene glycol and 1,4-cydohexanedimethanol.

In one embodiment, layer b) consists of polyester(s).

The selection of polyester(s) having an intrinsic viscosity higher than 0.75 dl/g for the base layer b) of the present films provides for the unexpectedly good formability, at high draw ratios, with very good conformation to the mold, minimal shrink back effect at removal from the mold together with high shrinking after thermoforming as shown in the present Examples 1, 2 and 4, in comparison with commercial films based on conventional polyesters.

Thermoformability of the film can be further improved by incorporating, preferably in the base layer, a plasticizer. Suitable plasticizers include aromatic dicarboxylic acid esters such as dimethyl phthalate, diethyl phthalate, di-n-butyl phthalate, di-n-hexyl phthalate, di-n-heptyl phthalate, di-2-ethylhexyl phthalate, di-n-octyl phthalate, di-n-nonyl phthalate, diethyl isophthalate, di-n-butyl isophthalate, di-2-ethylhexyl isophthalate, diethyl terephthalate, di-n-butyl terephthalate, di-2-ethylhexyl terephthalate, etc.; phosphoric acid esters such as triethyl phosphate, tri-n-butyl phosphate, trioctyl phosphate, cresyl phosphate, etc.; sebacic acid esters such as dimethyl sebacate, diethyl sebacate, di-n-butyl sebacate, diamyl sebacate, etc.; adipic acid esters such as hexyl adipate, etc.; esters such as butyl phthalyl butyl glycolate, tributyl citrate, tetrahydrofurfuryl oleate, methyl acetyl ricinoleate, etc.; and polyethylene glycol, etc.

In one embodiment, the plasticizer is selected from aromatic dicarboxylic acid esters (particularly phthalic acid esters) because they have excellent heat resistance, can significantly improve thermformability, and are free from problems of sublimation and bleed out during film-forming process.

The melting point of the plasticizer is preferably at least 300° C. or higher, more preferably at least 350° C. The content of the plasticizer in the layer is preferably 0.01 to 5%, more preferably 0.05 to 2% based on the weight of the polymeric material of the layer.

The percentage thickness ratio of polyester base layer b) to the film total thickness is generally from 40% to 90%, preferably from 50 to 85% or from 60 to 80%.

The percentage thickness ratio of the polyester base layer b) to the film total thickness is preferably higher than 50%, preferably higher than 60%, 65% or 70%.

The film for the present use is preferably a three-layer structure that includes, in addition to a base layer b) and to a first outer heat-sealable layer a), a second outer polyester layer c), preferably directly adhered to the opposite side of the base layer b).

The outer polyester layer c) of the film preferably comprises at least 80%, preferably at least 85%, at least 90% by weight with respect to the layer weight, of one or more polyesters.

In one embodiment, layer c) consists of polyester(s).

The one or more polyester resin of layer c) may be the same as the resin of the base layer b) or different, preferably the same.

Preferably, the second outer polyester layer c) comprises polyester(s) characterized by an intrinsic viscosity measured according to ASTM D4603-03 of at least 0.75 dl/g or higher and/or by a glass transition temperature Tg not higher than 80° C. and/or a melting point higher than 240° C. measured according to ASTM D3418.

Examples of suitable polyesters for the outer layer c) are EASTAPAK 9921 by Eastman Chemical or RAMAPET N180 by Indorama Polyester.

The thickness of the outer layer c) is generally between about 5 and 40%, preferably between 10 and 35%, more preferably 15 and 30% of the total thickness of the film. The outer layer c) may have a thickness of up to about 25 microns, preferably up to about 15 microns or 10 microns, more preferably between about 0.5 and 10 microns, and more preferably between about 0.5 and 7 microns.

The thickness of the two outer layers may be the same or different.

One or more of the layers of the film of the present invention may contain any of the additives conventionally employed in the manufacture of polymeric films. Thus, agents such as pigments, lubricants, anti-oxidants, radical scavengers, UV absorbers, thermal stabilizers, anti-blocking agents, surface-active agents, slip aids, optical brighteners, gloss improvers, viscosity modifiers may be incorporated as appropriate.

In particular, to improve the processing of the film in high speed packaging equipment, slip and/or anti-blocking agents may be added to one or both of the outer layers. The additives may be added in the form of a concentrate in a polyester carrier resin. The amount of additive is typically in the order of 0.2 to 5% by weight of the total weight of the layer.

In case the package is not under vacuum, the film of the present invention preferably comprises at least one surface provided with anti-fogging properties. Typically, the anti-fogging surface is the surface of the heat-sealable layer that directly faces the product.

To obtain an anti-fogging surface, anti-fogging agents may be compounded directly into the polyester resin of the heat-sealable layer before extrusion of the film for the use in the invention. Suitable anti-fogging agents are for instance non-ionic fluorinated surfactants, like alkylester fluorides, perfluoroalkyl ethyleneoxides, anionic fluorinated surfactants, like quaternary ammonium salt of perfluoroalkyl sulfonates, non-ionic surfactants, like polyhydric alcohol fatty acid esters, higher fatty acid amines, higher fatty acid amides, and ethylene oxide adducts of higher fatty acid amines or amides and the like. The amount of anti-fogging agent added to the heat-sealable layer is generally from 0.5 to 8%, from 1 to 5%, from 1 to 3% by weight of the heat-sealable layer.

Alternatively, the anti-fogging agent may be in the form of a coating applied onto the heat-sealable outer layer. Conventional techniques can be used for the application of the anti-fogging agent to the heat-sealable layer, like gravure coating, reverse kiss coating, fountain bar coating or spraying.

The application of the anti-fogging agent may be carried out either by an in-line method involving application during the manufacture of the polyester film or by an off-line coating method involving application after the manufacture of the polyester film.

Suitable anti-fogging agents for this application are nonionic surfactants like polyhydric alcohol fatty acid esters, higher fatty acid amines, higher fatty acid amides, polyoxyethylene ethers of higher fatty alcohols, and ethylene oxide adducts of higher fatty acid amines or amides. Among these, preferred are polyhydric alcohol fatty acid esters, polymethylene ethers of higher fatty alcohols and glycerin fatty acid esters.

The amount of the anti-fogging agent coating is not particularly limited, but it may be 0.1 to 8 ml/m$^2$, 0.5 to 7 ml/m$^2$, 0.5 to 5 ml/m$^2$.

The outer layer c) may have a thickness of up to about 25 microns, preferably up to about 15 microns, more preferably between 0.5 and 10 microns, and more preferably between about 0.5 and 7 microns. The thickness of the two outer layers may be the same or different.

The films for the present use may have any total thickness from 10 to 100 microns, from 15 to 75 microns, more preferably from 15 to 50 microns or from 15 to 35 microns.

Preferably, the present films, before thermoforming, have a thickness lower than 50, more preferably lower than 40, even more preferably lower than 35, 30 or 25 microns.

Preferably, the films before thermoforming have a thickness higher than 10, preferably higher than 12, more preferably higher than 15 microns.

Preferably, the films before thermoforming have a thickness from 10 to 100 microns, preferably from 15 to 75 microns, more preferably from 15 to 50 microns or from 15 to 35 microns.

Preferably, when the film is thermoformed in deep drawing, its total thickness before thermoforming is at least 15 microns, preferably 20 microns, more preferably 25 microns or 30 micron.

Preferably, the thickness of the film after thermoforming, measured at the bottom of the thermoformed cavity is lower than 20 microns, preferably lower than 15 microns. The polyester films for the use of the present invention are advantageous with respect to current dual ovenable thermoformable films on the market, providing comparable performances with lower thicknesses.

The polyester film for the use of the present invention may comprise the base layer b), a first outer heat-sealable layer a) and a second outer layer c), in which the second outer layer c) comprises a polyester resin different from the resin used both in the base layer and in the heat-sealable layer.

Alternatively, the polyester film may comprise the base layer b) and two outer heat-sealable layers a) comprising the same amorphous polyester or the same crystalline polyester having a melting temperature not higher than the melting temperature of the polyester of the base layer.

Alternatively, the polyester film may comprise the base layer b), a first outer heat-sealable layer a) and a second outer layer c), in which the second outer layer c) comprises the same polyester resin as the base layer b).

In one embodiment, the polyester film for the use of the invention comprises a base layer b) comprising a polyester having an intrinsic viscosity higher than 0.75 dl/g, a first outer heat-sealable layer a) comprising an amorphous polyester and a second outer layer c) comprising the same polyester resin as the base layer.

In one embodiment, the polyester film for the use of the invention comprises a base layer b) comprising a polyester having an intrinsic viscosity higher than 0.75 dl/g, a first outer heat-sealable layer a) comprising a ternary blend of an amorphous polyester, a thermoplastic resin and a further polyester, and a second outer layer c) comprising the same polyester resin as the base layer.

Preferably, the polyester film comprises a base layer b) comprising at least 50%, 60%, 70%, 80%, 85%, 90%, 95% of the polyester resin having an IV higher than 0.75 dl/g and no more than 50%, 40%, 30%, 20%, 15%, 10%, 5% of an amorphous polyester, a first outer heat-sealable layer a) comprising an amorphous polyester and a second outer layer c) comprising the same polyester resin as the base layer.

Preferably, the amorphous polyester in the base layer b) is the same as the amorphous polyester in the heat-sealable layer a).

In one embodiment, the polyester film for the present use comprises:
a heat sealable layer a) comprising
    from about 25% to 70% by weight of at least a first amorphous polyester having a melting temperature not higher than the melting temperature of the polyester of the base layer b),
    from 10% to 20% by weight of at least a thermoplastic resin selected from polyamides, polystyrenes, polyethylenes, ionomers, ethylene/unsaturated carboxylic acid copolymers, ethylene/unsaturated esters copolymers, ethylene/propylene copolymers, maleic anhydride-modified polyethylene and ethylene/cyclic olefin copolymers, preferably a maleic anhydride-modified polyethylene and
    from 20% to 60% by weight of at least a further polyester characterized by an intrinsic viscosity measured according to ASTM D4603-03 of at least 0.75 dl/g or higher and/or by a glass transition temperature Tg not higher than 80° C. and/or a melting point higher than 240° C. measured according to ASTM D3418; and/or
    an inner polyester base layer b) comprising an admixture of at least 50% of a polyester resin having an IV higher than 0.75 dl/g, and at most 50% of an amorphous polyester; and/or
    an outer polyester layer c) comprising a polyester characterized by an intrinsic viscosity measured according to ASTM D4603-03 of at least 0.75 dl/g or higher and/or by a glass transition temperature Tg not higher than 80° C. and/or a melting point higher than 240° C. measured according to ASTM D3418.

Preferably, the polyester film for the present use consists of:
    a heat sealable layer a) comprising from about 25% to 70% by weight of at least a first amorphous polyester having a melting temperature not higher than the melting temperature of the polyester of the base layer b),
    from 10% to 20% by weight of at least a thermoplastic resin selected from polyamides, polystyrenes, polyethylenes, ionomers, ethylene/unsaturated carboxylic acid copolymers, ethylene/unsaturated esters copolymers, ethylene/ propylene copolymers, maleic anhydride-modified polyethylene and ethylene/cyclic olefin copolymers, preferably a maleic anhydride-modified polyethylene and from 20% to 60% by weight of at least a further polyester characterized by an intrinsic viscosity measured according to ASTM D4603-03 of at least 0.75 dl/g or higher and/or by a glass transition temperature Tg not higher than 80° C. and/or a melting point higher than 240° C. measured according to ASTM D3418; and an inner polyester base layer b) comprising an admixture of at least 50% of a polyester resin having an IV higher than 0.75 dl/g, and at most 50% of an amorphous polyester; and an outer polyester layer c) comprising a polyester characterized by an intrinsic viscosity measured according to ASTM D4603-03 of at least 0.75 dl/g or higher and/or by a glass transition temperature Tg not higher than 80° C. and/or a melting point higher than 240° C. measured according to ASTM D3418.

In one embodiment, the polyester film for the present use consists of a heat sealable layer a) consisting of from about 40% to 70% by weight of at least a first amorphous polyester having a melting temperature not higher than the melting temperature of the polyester of the base layer b), from 10% to 20% by weight of at least a thermoplastic resin selected from ethylene/unsaturated carboxylic acid copolymers, ethylene/unsaturated esters copolymers and maleic anhydride-modified polyethylene and from 20% to 50% by weight of at least a further polyester characterized by an intrinsic viscosity of at least 0.75 dl/g or higher and/or by a glass transition temperature Tg not higher than 80° C. and/or a melting point higher than 240° C.; and an inner polyester base layer b) consisting of an admixture of at least 55% of a polyester resin having an IV higher than 0.75 dl/g, and at most 45% of an amorphous polyester; and an outer polyester layer c) comprising at least 95% of the same polyester characterized by an intrinsic viscosity of at least 0.75 dl/g of the base layer b).

Preferred films for the present use are films consisting of an outer heat sealable layer a) consisting of about 60% by weight of a PETG, 25% by weight of a PET and 15% by weight of a mod-LLDPE or of an EAA;

an inner base layer b) consisting of about 60% by weight of a PET having an IV higher than 0.75 dl/g and 40% by weight of a PETG; and an outer polyester layer c) consisting of about 98% by weight of the same PET of the base layer and 2% by weight of a PETG.

Exemplary films, usable in the present invention and their manufacturing processes are described in WO2012160142 and WO2007093495.

Other possible films and their preparation are disclosed in WO2009013284 (e.g. film of Ex. 2) and WO2013080143 in the name of Cryovac.

The Applicant has surprisingly found that the polyester film described above shows so good formability and shrink properties that can be advantageously used in deep-drawing and/or thermoform-shrink applications. In a preferred embodiment, the films are used in a deep-drawing thermoform-shrink packaging method.

The formability of the polyester film for use in the present method may be evaluated visually after a thermoforming cycle, by calculating the thermoforming draw ratio or, preferably, by measuring the actual volume of the thermoformed cavity. The thermoforming draw ratio expresses a theoretical value of formability, calculated on the mold dimensions as follows:

Draw Ratio=Surface Area of the mold/Footprint of the mold.

An example of calculation of a draw ratio for a parallelepiped mold of 2 cm of depth is the following:

Mold dimensions: 10 cm length×12 cm width×2 cm depth

Surface Area: 2(10 cm×2 cm)+2(12 cm×2 cm)+(10 cm×12 cm)=208 cm²

Footprint: 10 cm×12 cm=120 cm²

Draw Ratio:=1.7

This draw ratio represents the maximum drawing that the material can experience in that mold if it ideally conforms to the mold.

Preferably, in the present deep-drawing method, the draw ratio in the forming step is higher than 2.0, more preferably higher than 2.5, 3.0, 3.5, 4.0 or 4.5.

However, depending on the formability of the film and on the mold construction, the actual draw ratio—namely the draw ratio evaluated on the thermoformed container may differ even significantly from the theoretical value.

The actual draw ratio may be difficult to be calculated especially in case of irregularly shaped or ribbed containers.

An easier evaluation of the formability of a film may be carried out by comparing the actual volume of the thermoformed cavity of the container with respect to the volume of the mold. These volumes can be indirectly evaluated on the basis of the weight of water needed to fill in the cavity or the mold respectively, as explained in the present experimental part under the "volume test" (Index of shrinkage after thermoforming).

The difference in the volumes (or in the water weights) of the cavity and of the mold is related to the formability of the tested material.

This difference in the volumes may be calculated as explained later on according to the formula:

$$\Delta V\% = [(V\text{cavity} - V\text{mold})/V\text{mold}] \times 100 = [(Ww\text{cavity} - Ww\text{mold})/Ww\text{mold}] \times 100$$

in which V is the volume of the cavity or of the mold (expressed for instance in cc) and Ww is the weight of water that filled in either the cavity or the mold in grams. The more negative this percentage, the more the film retracts after extraction from the mold.

Figure 2A:
FIG. 2 shows the pictures of thermoformed containers 2A, 2B made from commercial films (Mylar OL25 and MylarOL40) and 2C made from the film 7 suitable for use in the present invention.
Figure 2B:
Figure 2C:

The polyester films used in the present thermoforming methods are characterized by a difference in percentage of the volumes generally lower than −35%, preferably lower than −30% or than −25%—meaning that the actual volume of the thermoformed cavity is quite close to the original volume of the mold. For the commercial comparative films Mylar tested in the present experimental section, this difference is generally quite marked, namely it is higher than −35%, e.g. −40% or more, meaning that the commercial film, even if thermoformed at the same draw ratio, is less formable and results in a cavity of significantly lower volume (see the pictures of FIG. 2A-2C).

The film for the use as bottom web according to the present invention may be heat shrinkable or not.

In one embodiment of the deep drawing packaging method, the polyester film may be not heat-shrinkable, namely may have a free shrink percentage in both LD and TD directions lower than 3%, preferably lower than 2%.

In such a case, after orientation, the polyester film is heat-set by a tailored annealing step.

Preferably, the polyester film for use in a deep-drawing food packaging method may be heat-shrinkable. Advantageously the present film is endowed with very good shrink properties even after thermoforming, thus providing with a final heating very tight and appealing packages.

In thermoform-shrink applications, the polyester film is heat-shrinkable, both before and after thermoforming.

In a preferred embodiment of the present thermoform-shrink packaging method, the polyester film of the bottom web is heat-shrinkable, it is formed at a draw ratio higher than 1.26 and the sealed package is finally heat-shrunk.

Preferably, the polyester film for use in thermoform-shrink packaging has a free shrink percentage, before thermoforming, in at least one of LD or TD directions of at least 3%, more preferably of at least 4%. Preferably, the polyester film has a free-shrink percentage, before thermoforming, in both LD and TD directions of at least 3%, more preferably of at least 4%, measured according to the test method described in the present experimental section.

Preferably, the polyester film has a total free-shrink percentage, before thermoforming of at least 5%, more preferably of at least 10%, measured according to the test method described in the present experimental section.

Advantageously, the polyester film for the use in a thermoform-shrink method, show remarkable shrink properties after thermoforming, thus allowing a tight shrinking around the product and an improved appearance of the package, without wrinkles or vacant gas, upon gentle heating in e.g. an air shrink tunnel.

In particular, the polyester film for use in the present thermoform-shrink food packaging method show a free shrink percentage after thermoforming in at least one of LD or TD directions of at least 15%, more preferably of at least 20%.

The polyester film for use in the present thermoform-shrink food packaging method show a free shrink percentage after thermoforming in both LD and TD directions of at least 15%, more preferably of at least 20%, even more preferably of at least 23%. The polyester film for use in the present thermoform-shrink food packaging method show a total free shrink percentage after thermoforming of at least 40%, preferably of at least 43%, more preferably of at least 45% or 50%.

The polyester film for use in the present packaging method are preferably characterized by a tensile strength of at least 1500 Kg/cm$^2$, more preferably of at least 1600 Kg/cm$^2$ in at least one of LD or TD directions, measured at 23° C., (ASTM D882).

The polyester film for use in the present packaging method are preferably characterized by a tensile strength of at least 1500 Kg/cm$^2$, more preferably of at least 1600 Kg/cm$^2$ in both LD and TD directions, measured at 23° C., (ASTM D882).

The polyester film for use in the present packaging method are preferably characterized by an elongation at break of at least 100%, more preferably of at least 105% in at least one of LD or TD directions, measured at 23° C., (ASTM D882). The polyester film for use in the present packaging method are preferably characterized by an elongation at break of at least 100%, more preferably of at least 105%, in both LD and TD directions, measured at 23° C., (ASTM D882).

The polyester film for use in the present packaging method are preferably characterized by an elastic modulus of at least 20,000 Kg/cm$^2$, more preferably of at least 22,000 Kg/cm$^2$ in at least one of LD or TD directions, measured at 23° C. (ASTM D882).

The polyester film for use in the present packaging method are preferably characterized by an elastic modulus of at least 20,000 Kg/cm$^2$, more preferably of at least 22,000 Kg/cm$^2$, in both LD and TD directions, measured at 23° C. (ASTM D882).

The polyester film for the present use is dual ovenable so the thermoformed container and the package made therefrom may withstand re-heating in a microwave or conventional oven and cook-in in a traditional oven at very high temperatures, higher than 205° C. and up to 220° C.

The present film, having a peelable sealant, provides for easy opening packages. Furthermore, the present film provides for self-venting packages, namely packages that during cooking, open at the seal and release internal vapors.

The present films, due to the polyester-based composition, provide for final packages with excellent optics (transparency and glossiness).

The polyester film for the present use can be manufactured according to any process known in the art for producing a biaxially oriented film, for example a tubular or a flat film orientation process.

The polyester film, preferably the three layers film, can be prepared by coextrusion, by coating or by extrusion coating, preferably by coextrusion according to a tubular process or a flat process.

In a tubular process, also known as "double bubble" process, simultaneous biaxial orientation is obtained by extruding a thermoplastic resin tube, which is subsequently quenched, reheated and then expanded by internal gas pressure to induce transverse orientation, and wound at a rate which will induce longitudinal orientation. An example of an equipment suitable for this technique is disclosed in U.S. Pat. No. 4,841,605.

In a flat film process, the film-forming thermoplastic resins are extruded through a T-die and rapidly quenched upon a chill roll to ensure that the resins are quenched to the amorphous state. Orientation is then effected by stretching, simultaneously or sequentially, preferably simultaneously, the quenched extrudate at a temperature above the glass transition temperature of the thermoplastic resin.

In the sequential flat orientation method a flat, quenched extrudate is firstly oriented in one direction, usually the longitudinal direction, i.e. the forward direction through the film stretching machine, and then in the transverse direction. Longitudinal stretching of the extrudate is conveniently carried out over a set of rotating rolls (MDO), which rotate at different speeds. At least one of the first pairs of rolls is heated, for example by inner circulation of hot oil. Transverse stretching is usually carried out in a tenter apparatus (TDO), which comprises a certain number of heating means and suitable stretching means.

In a simultaneous flat orientation, the resulting hot and clipped sheet is directed to the stretching zone of the simultaneous tenter. Any simultaneous stretching means can be used in said zone. Preferably, however the clips are propelled throughout the opposed loops of the tenter frame by means of a linear synchronous motor. A suitable line for simultaneous stretching with linear motor technology has been designed by Bruckner GmbH and advertised as LISIM line. An alternative line for simultaneous stretching of the extruded flat tape is the DMT line, based on a pantograph, equipped with two separated monorails on each side of the orientation unit. The configuration of the tenter can be varied depending on the stretching ratios desired. In the subsequent annealing step, the biaxially oriented film may be dimensionally stabilized by heat-treatment at a temperature below the melting temperature of the film.

Preferably, the polyester film for the use of the invention is manufactured according to a flat coextrusion. The polymers for the base layer b), for the heat-sealable outer layer a) and for the second outer layer c) are fed to separate extruders. The melts are extruded through a multilayer T-die and quenched over a chill roll. The so formed cast is then biaxially oriented, preferably simultaneously biaxially oriented.

In case of sequential orientation, longitudinal stretching (LD or Machine Direction Orientation) of the extrudate is conveniently carried out at a temperature range from 60 to 120° C., preferably 70 to 100° C. and in the transverse stretching (Transverse Direction Orientation), in the range from 90° C. (preheating zone) to 130° C. (stretching zone), preferably from 90° C. (preheating zone) to 110° C. (stretching zone). The longitudinal stretching ratio is in the range from 2.0:1 to 5.0:1, preferably from 2.3:1 to 4.8:1. The transverse stretching ratio is generally in the range from 2.4:1 to 6.0:1, preferably from 2.6:1 to 5.5:1.

However, preferably, the polyester films for the use of the present invention are simultaneously oriented.

The temperatures for the simultaneous orientation are from 90 to 110° C. (preheating zones) and from 90 to 110° C. (stretching zones), preferably from 90 to 100° C. and from 93° C. to 103° C. respectively.

The stretching ratios in LD are from 2.5:1 to 5:1, preferably from 3.0:1 to 4.2:1, and in TD from 2.5:1 to 6:1, preferably from 3.2:1 to 4.4:1.

Annealing is carried out at a temperature of from 160 to 250° C., preferably from 180 to 240° C., even more preferably from 220 to 240° C. The annealing temperature can be used to fine tuning the final shrink properties of the film.

Preferably, the polyester film for the use according to the present invention is biaxially oriented and heat-set.

Preferably, the polyester film for the present use in deep thermoforming has a free shrink percentage lower than 10% in both LD and TD (measured as described in the experimental section, in oven at 180° C., 5 minutes).

Preferably, the biaxially oriented polyester film for the present use in deep thermoforming is heat-set up to a total free shrink percentage lower than 15%, preferably lower than 10% or 5%.

Preferably, the biaxially oriented film for the present use in shrink-thermoforming has a total free shrink percentage before thermoforming measured in oven at 180° C. according to the test method reported in the experimental part of at least 5%, more preferably of at least 10%.

The bi-oriented polyester film is finally cooled and wound up in a customary manner. Other methods of manufacturing the present films include coating the heat-sealable polymer of layer a) onto a substrate layer, comprising layers b) and c). Coating may be effected using any suitable coating technique, including gravure roll coating, reverse roll coating, dip coating, bead coating, extrusion-coating, melt-coating or electrostatic spray coating. Coating may be conducted "off-line", i.e. as a separate step after stretching and subsequent heat-setting of the base layer, or "in-line", i.e. before, during or between any stretching operation(s).

Prior to application of the heat-sealable layer onto the substrate, the exposed surface of the substrate may, if desired, be subjected to a chemical or physical surface-modifying treatment to improve the bond between that surface and the subsequently applied layer. For example, the exposed surface may be subjected to a high voltage electrical stress accompanied by corona discharge. Alternatively, the exposed surface may be pretreated with an agent known in the art to have a solvent or swelling action, such as a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The polyester films for the use of the present invention may be printed. Printing the material before thermoforming improves consumer appeal.

In view of the use, both the top web and the bottom web are preferably approved by the relevant authorities for use in food applications.

The method according to the invention comprises the steps of
  providing a thermoformable dual ovenable biaxially oriented polyester film as previously described as bottom web;
    forming the bottom web thus providing at least a cavity with an opening;
    placing a food product in the cavity through the opening;
    closing the cavity at the opening, preferably under vacuum, either by hermetically sealing the bottom web to itself or by providing a dual ovenable top web and hermetically sealing the dual ovenable top web to the bottom web, all around the opening; and
    cutting out the sealed package.

The present thermoforming food packaging method is characterized by
  i) a draw ratio, in the forming step, higher than 1.26 (deep-draw food packaging method), preferably higher than 2, than 3, than 4 or even than 4.5 thus providing a deep drawn thermoformed package or
  ii) by the use of a heat shrinkable film and by a further final shrinking step after thermoforming (thermoform-shrink food packaging method), thus providing a thermoformed-shrunk package.

Preferably, the present thermoforming food packaging method is characterized by
  i) a draw ratio, in the forming step, higher than 1.26 (deep-draw food packaging method), and
  ii) by the use of a heat shrinkable film and by a further final shrinking step after thermoforming (thermoform-shrink food packaging method), thus providing a deep-drawn thermoformed-shrunk package.

Preferably, the thermoformed cavity ends with a peripheral heat sealable flange surrounding the opening.

The top web, if present, may be any dual ovenable film, which is suitable for hermetically closing the opening of the cavity thermoformed in the bottom web.

The top web may be shrinkable or not, thermoformable or not, of the same or of a different, generally lower, thickness of the bottom web, depending on the desired final package variant.

The top web may be a flat film, another thermoformed flexible container (generally used for packaging protruding products) or a stretch film.

In one embodiment, the top web is a film different from the bottom web.

The dual ovenable top web may be a monolayer film, preferably based on polyesters or in alternative may be a multilayer film comprising a substrate, preferably based on polyesters and a heat-sealable layer. The heat sealable layer is involved in bond formation with the bottom web to provide the final hermetic package.

As the bottom web comprises a heat-seal layer, the top web may or may not include a heat-seal layer.

In one embodiment, the top web has the same composition of the bottom web.

In one embodiment, the top web has the same composition and thickness of the bottom web.

In one embodiment, the top web has the same composition, thickness and shrink properties of the bottom web.

In one embodiment, the top web is the same film of the bottom web.

The total thickness of the top web is typically from 12 to 200 microns, preferably from 12 to 100 microns, more preferably from 15 to 35 microns.

The forming step of the present packaging methods is the step of forming in the bottom web at least a cavity, preferably surrounded by a flat peripheral portion, i.e. a flange.

The forming step is carried out by thermoforming, preferably vacuum thermoforming, possibly plug assisted thermoforming, according to conventional techniques and using commercially available equipment.

"Thermoforming" refers to a process which comprises the steps of heating the material to a temperature (T1) wherein T1 is above the glass transition temperature (Tg) of the material, and if the material exhibits a crystalline melting temperature (Tm) wherein T1 is below the crystalline melting temperature, and then subjecting the material to deformation, i.e. deforming the material while it is in its softened rubbery, solid state.

In one embodiment, the present packaging process is carried out at higher draw ratios (deep-drawing) without any final shrinking of the package.

In the deep-drawing food packaging method the draw ratio in the forming step is preferably higher than 2.0, than 2.5, than 3.0, than 3.5, than 4.0 or even than 4.5.

The deep draw method offers great freedom in terms of shape and sizes of the containers. The present films allow a smooth and deep drawing, providing containers with a uniform thickness, higher internal volumes and a high definition of mold carvings.

The step of closing the cavity requires heat sealing the top web to the bottom web all around the opening, preferably along a dedicated flat surface, namely along a peripheral flange, or self-sealing the bottom web at the cavity opening.

For an effective heat sealing, the polymeric material of the at least one heat-sealable surface should soften to a sufficient extent to adhere to the other surface to be sealed to.

Typically, the heat-sealing property of a polyester layer having a melting temperature (Tm) is manifested at a temperature below Tm, and in that case it would not be necessary to exceed Tm when forming a heat-seal bond. Exemplary heat sealing temperatures for the present top and bottom webs are from 190° C. to 220° C.

In another embodiment, the present packaging method is a thermoform-shrink packaging method, in which at least the bottom web is heat shrinkable, optionally both the top and the bottom web are heat-shrinkable.

Heat shrinkage of the packaging material of the bottom web or of both the bottom and the top webs induced by a heat-treatment, provides the desired tight appearance to the end preferably vacuum package.

The polyester films used as bottom webs in the present thermoform-shrink food packaging method are endowed with very high shrinkage after thermoforming and thus provide very tight dual ovenable, preferably vacuum packages devoid of wrinkles and residual bubble.

There are several variants of the present thermoform-shrink packaging process, such as the use of a lid, which may or may not be heat-shrinkable, may or may not be deep-drawn or may or may not be stretched over the product.

Furthermore, there are different manners under which the package may be shrunk, e.g., heating only the deep-drawn container or the whole package, carrying out the heat-shrinking step on the end package exiting the sealing, preferably vacuum chamber, or carrying out the heat-shrinking step while the package is still in the vacuum chamber, before or after it is sealed.

Shrinking is preferably done after sealing, outside the sealing, preferably vacuum chamber, using an air shrink tunnel.

Figure 3:
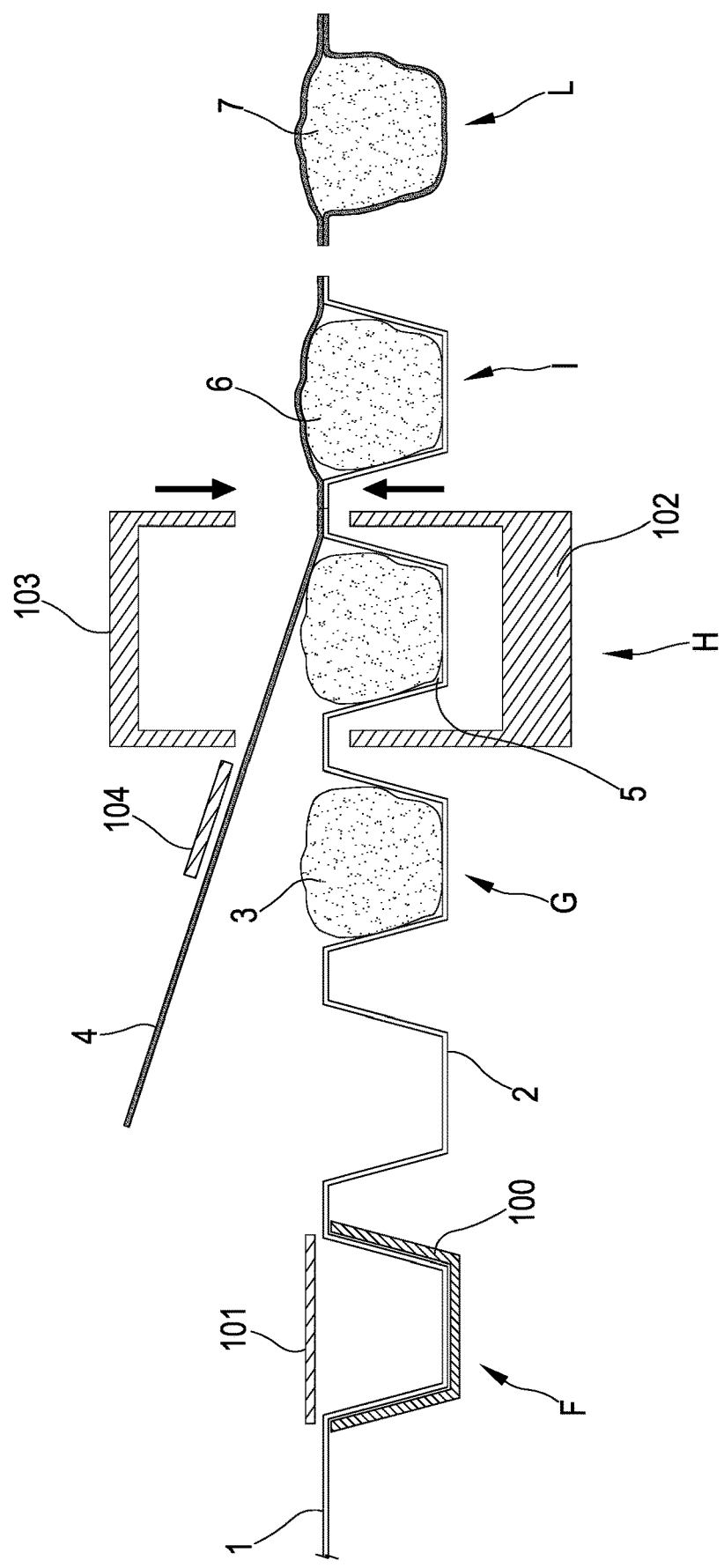
FIG. 3 is a scheme of a "thermoform-shrink" process.

In FIG. 3, a "thermoform-shrink" packaging process is schematically illustrated. The film, indicated as 1, in the form of a webstock unwind from a roll and is laterally gripped (not shown in the Figure) by circulating strands of chains and guided from the line input towards the deep-drawing station F. In said station, once the heating plate 101 has heated the film to a temperature sufficient to soften it, the heat-softened thermoplastic film is deep-drawn in the mold 100. Heating can be done by radiation (e.g., infrared radiation), convection, conduction or any combination of these methods. The temperature reached by the film should be high enough to allow it to form well but not too high as otherwise it may flow excessively. Typically, in the thermoforming process according to the present invention a temperature of about 180-200° C. is used. In the basic forming method, the primary force causing the softened plastic film to come into contact with the mold is the difference in pressure between the two sides of the plastic sheet. This can be obtained either by applying a vacuum in the mold through the ports (in the bottom part of the mold, not shown) and/or by causing compressed air from the ports (in the plate above the mold, not shown) to force the softened plastic into contact with the mold. Other methods might be used in this forming step, such as for instance, the plug assisted thermoforming method but it appears that for thin films like the present films there is no need to use these more sophisticated methods. The mold may be a single or a multiple one and the shape of each cavity may vary as desired. Molds with a depth of from about 40 to about 140 mm are preferably used. Once the forming step in station F is completed, the mold 100 is lowered and the formed containers 2, still joined together by the plastic web laterally gripped, are guided along the packaging line to a loading station G where they are loaded, either manually or automatically, with the product to be packaged 3. Then the loaded containers are moved to a vacuum sealing chamber H where an upper film 4 is supplied on top of the loaded container 5. The vacuum-sealing chamber H is made by a lower part 102 and an upper part 103 which are movable in a reciprocating manner in the direction of the arrows to close the chamber. Once the chamber is closed, the space within the chamber is evacuated, including the space between the loaded deep-drawn container 5 and the upper film 4 and a sealing frame (not shown in FIG. 3) is then actuated to seal the two along the flange of the deep-drawn container. If the product loaded into the deep-drawn container protrudes above the plane of the flange of the container, the upper film 4 will have either to be deep-drawn similarly to the lower one, or stretched over the top surface of the product. In both cases, the upper film will have to be laterally gripped by strands of circulating chains. In the former case, a forming station as described above but providing for an inverted deep-drawn container will be present upstream the vacuum sealing station H to deep-draw the upper lidding film. The mold used in this case will have the same shape as that used for the lower film but not necessarily the same depth, and the deep-drawn container 3 and the deep-drawn lid obtained from the upper film 4, will enter into the vacuum-sealing station H in such a way that once the chamber is evacuated, their flanges will overlap. In the latter case, it will be sufficient to heat the gripped upper film before guiding it into the vacuum-sealing chamber to allow its easy stretching. Heating can be obtained by contacting the film with a heating plate 104 or by any other known means.

Once the package is sealed in the vacuum-sealing chamber H, air is restored in the chamber and the chamber is opened. The packages 6 (I) are separated, either inside or outside the vacuum chamber by means e.g. of cutting knives and then conveyed to a shrink station L, where they are subjected to a heat treatment that shrinks the packaging material and gives the tight appearance to the end packages 7. For instance a water bath, a hot air tunnel or an IR heater, could suitably be employed in this step.

In one embodiment, the present packaging process includes both the deep-drawing of the bottom web and the final shrinking of the closed package.

The deep-drawing thermoform-shrink packaging process can be summarized as including the following steps:

1. Heating a dual ovenable biaxially oriented heat-shrinkable bottom web (the present polyester film as previously described) and forming it with the help of positive or negative pressure in a mold, so that the bottom web is deeply formed taking the shape of the deep mold.
2. Placing the food product inside the formed cavity of the bottom web.
3. Preferably applying vacuum and heat-sealing a top web to the opening of the cavity in the bottom web, so that the package is fully sealed.
4. Heat shrinking the whole package for a better, more appealing presentation.

In the thermoform-shrink packaging process of the present invention, the dual ovenable biaxially oriented film is heat shrinkable and it is characterized by a % free shrink before thermoforming of at least 3%, preferably of at least 4% in at least one of LD or TD, measured as described in the experimental section.

In the thermoform-shrink packaging process of the present invention, the dual ovenable biaxially oriented film after thermoforming is characterized by a total free shrink percentage after thermoforming of at least 40%, preferably of at least 43%, more preferably of at least 45% or 50%, measured as described in the experimental section.

The second object according to the present invention is a dual ovenable thermoformed flexible container, comprising a thermoformed cavity and an opening, made by thermoforming the film of the bottom web described above, in which the depth of the thermoformed cavity is higher than 1 cm and/or the thermoformed container is heat-shrinkable.

The flexible container according to the invention has a draw ratio higher than 1.26, preferably higher than 2.0, more preferably higher than 2.5, even more preferably higher than 3.

Preferably, the depth of the thermoformed cavity is higher than 2 cm, more preferably higher than 3 cm, or 4 cm, or 5 cm, or 6 cm, or 7 cm, or 8 cm, or 9 cm, or 10 cm.

Preferably, the present thermoformed container is heat shrinkable. In particular, the thermoformed film of the container has a total free shrink percentage after thermoforming of at least 40%, preferably of at least 43%, more preferably of at least 45% or 50%, measured as described in the experimental section.

Preferably, the present container is both deep-drawn, namely thermoformed at a depth higher than 3 cm, or 4 cm, or 5 cm, or 6 cm, or 7 cm, or 8 cm, or 9 cm, or 10 cm, and heat shrinkable, namely has a total free shrink percentage after thermoforming of at least 40%, preferably of at least 43%, more preferably of at least 45% or 50%.

Preferably, the container comprises a cavity, an opening and a flat surface (i.e. a flange) surrounding the opening, onto which the top web can be afterwards sealed, thus providing the airtight flexible package.

As can be seen from the deep drawing trial described under Example 1, the thermoformed container according to the present invention is characterized by a uniformity of thickness of the thermoformed film along the bottom and, especially, along the walls, which is not obtainable with the comparative prior film Mylar. This even distribution of the material upon thermoforming is due to the high formability of the films used for the manufacture of the present containers.

Preferably, in the present containers, the thickness of the film after thermoforming is lower than 25 microns, more preferably lower than 20 micron, even more preferably lower than 15 microns measured at the bottom of the container.

In one embodiment, a thermoformed container can be prepared by thermoforming a composite material comprising a polyester film as previously described, adhered as a liner to a cardboard by conventional techniques, such as for instance by glue lamination or hot lamination.

FIG. 1 shows a cross-section of a deep-drawn thermoformed container (201) according to the invention. The container (201) may be part of a semi-finished web including a plurality of thermoformed containers (201). Each container (201) comprises a drawn part forming a cavity (202) which is delimited by a bottom (202a), by side walls (202b) emerging from the bottom and by a top opening (203) (see dotted line in FIG. 1).

The top opening (203) is surrounded by a flat peripheral portion (204) (i.e. a flange). The top opening (203) forms the inlet mouth through which a food product to be packaged is introduced during the packaging process. The opening (203), when seen in from the top, may present any convenient shape such as rectangular, square, circular, oval, or other shape suitable to allow access of the product into the cavity (202). The container (201) is characterized by a height H, a length L and a width W.

As explained before, the actual draw ratio may be calculated based on the measures (H, L and W) of the cavity of the thermoformed container.

The difference in the draw ratio calculated on the mold in respect of the actual draw ratio calculated on the thermoformed container, may provide an index of the actual formability of the film. This assessment however is difficult if the thermoformed container has an irregular shape or has not flat surfaces.

As explained in details in the experimental section, a simpler index of formability (Index of shrinkage after thermoforming) may be indirectly calculated from the volumes of the thermoformed cavity of the container and of the mold, assessed by weighing the water needed to fill in said volumes.

Preferably, the polyester films for use in the present method and the containers made therefrom have an Index of shrinkage after thermoforming lower than −35%, more preferably lower than −30%, even more preferably lower than −25% or −20%, measured as described in the present experimental section.

Advantageously, the present thermoformed container is then used to package an article (food), preferably vacuumed, sealed and, preferably, shrunk, providing tight packages.

A third object according to the present invention is a dual ovenable hermetic thermoformed package comprising a dual ovenable thermoformed flexible container as previously described comprising a thermoformed cavity and an opening, a food product placed in the cavity, said opening being hermetically closed either by the flexible container self-sealed at the opening or by a dual ovenable top web sealed to the container all around the opening.

In one embodiment, the package according to the present invention does not comprise a top web but only the flexible container, self-sealed at the opening of the cavity, thus enclosing the product.

Preferably, the package according to the present invention comprises a top web sealed all around the opening of the container.

Regarding the possible variants of the package according to the present invention, the same possibilities reported for the packaging method apply herein, namely the presence or not of a top web, a top web flat, drawn or stretched, heat-set or heat shrinkable etc.

In the present thermoformed package, preferably deep-drawn and/or shrunk, package, at least the container according to the invention is thermoformed.

In such a case, the opening of the container may be closed by a non-thermoformed lid, which may be made of the same film of the container or a different dual ovenable film.

In one embodiment, the non-thermoformed lid and the thermoformed container are made of the same film described above. Preferably, the film of the lid is thinner than the film of the container.

In another embodiment, both the top and the bottom of the package may be thermoformed, at the same or different depth, but at least one of them being deep-drawn.

Preferably, the present package is vacuumized.

Preferably, the present package is vacuumized and heat-shrunk.

Thermoformed packages are generally obtained on thermoforming machines, which use roll-stock materials. Two rolls are used, one for the bottom web, which is unwound, heated by a warm plate, and formed into cavities, where the product to be packaged is subsequently loaded, and one for the top web, if present, which is sealed onto the bottom web inside a sealing vacuum chamber from which the air has been preferably removed.

In one embodiment of the present package, the bottom is thermoformed thus providing a cavity and a surrounding flange, the top is sealed all around onto the flange. The thermoformed bottom may be pre-made or thermoformed in line, preferably it is thermoformed in line.

In one embodiment of the present package, the package comprises two separated pieces of films, top and bottom, sealed together along a peripheral surface surrounding the product. In this embodiment, the bottom is thermoformed thus providing a cavity, both the films of the top and of the bottom are dual ovenable films substantially made of polyester(s), as defined above, preferably top and bottom films are the same film, more preferably the are both heat-shrinkable.

The product, in the present package, is a food product, preferably a food product selected from fish (whole or portioned), meat, particularly fresh red meat, processed meat, poultry, pork, lamb, bakery (also partially baked or frozen), seafood, stabilized vegetables or ready-meals.

Optionally, the packaged food can be frozen for a longer storage and then the same package can be directly placed in the oven for cooking.

In one preferred embodiment, the package according to the invention is self-venting, namely it allows vapors in excess to escape the package during cooking. Advantageously, the opening of the present packages along the seals during cooking is limited, thus preserving part of the juices and thus providing well-cooked food flavored, tender and juicy internally but roasted at surface of the food.

Accordingly, a fourth object of the present invention is a method for cooking a food product, which comprises providing dual ovenable thermoformed package including said product, according to the present invention, and cooking the packaged food in said package in a microwave or conventional oven.

In one embodiment of this method, the cooking step is carried out in a conventional oven at a temperature higher than 205° C. and/or up to 220° C.

EXAMPLES

The present invention can be further understood by reference to the following examples that are merely illustrative and are not to be interpreted as a limitation of the scope of the present invention that is defined by the appended claims.

The films used for the present methods comprise the following resins:

PET1 RAMAPET N180, Indorama Polyester, copolymer of terephthalic acid, isophthalic acid and mono-ethylene glycol Density 1.4 g/cc, Intrinsic Viscosity 0.80 dl/g, Glass transition temperature 78° C., Melting point 245° C.

PET2 co-polyester Eastman Chemical EASTAPAK 9921 Density 1.4 g/cc Melting point 238.0° C., I.V. 0.80 dl/g.

PETG1 Co-polyester of terephthalic acid, 1,4-cydohexane dimethanol and ethylene glycol, EASTAR PETG 6763-Eastman Chemical Polyethylene Terephthalate/Glycol Density 1.27 g/cc, Glass Transition 81° C., Melt Flow Rate (Cond. 200° C./05.00 kg (G)) 2.8 g/10 min, Viscosity Solution 0.75 mPa·sec PETG2 Masterbatch AntiBlock and Slip in Amorphous Polyethylene Terephthalate/Glycol Co-polyester of terephthalic acid, 1,4-cyclohexane dimethanol and ethylene glycol, SUKANO G dc S503 Silica 10%, Wax 6%, Bulk (Apparent) Density 1.2 g/cc, Vicat Softening Point 82° C.

LLDPE-mod: BYNEL 4104 (2006) DuPont, Maleic Anhydride-Modified Ethylene/Butene Copolymer Density 0.9200 g/cc, Melt Flow Rate (Cond.190° C./02.16 kg (E)) 1.10 g/10 min, Melting point 125° C.

EAA: PRIMACOR 3440 Dow Ethylene/Acrylic Acid Copolymer Co-monomer content Acrylic Acid 9.7%, Density 0.938 g/cc, Melt Flow Rate 190° C./02.16 kg 10 g/10 min, Vicar softening point 76° C.

In the following Tables 1 and 2, the composition (% by weight with respect to the layer weight) of the films 1 to 9 for the thermoforming methods according to the present invention are shown:

TABLE 1

|  | Film 1 | Film 2 | Film 3 | Film 4 | Film 5 | Film 6 |
|---|---|---|---|---|---|---|
| Total thickness | 33 mic. | 22.5 mic. | 17.5 mic. | 33 mic. | 22.5 mic. | 33 mic. |
| Layer 1 Sealant layer a) | PET2 25% PETG1 60% EAA15% 4.5 mic | PET2 25% PETG1 60% EAA15% 2.6 mic | PET2 25% PETG1 60% EAA15% 2.0 mic | PET2 45% PETG1 40% EAA 15% 4.5 mic | PET2 45% PETG1 40% EAA 15% 2.6 mic | PET2 25% PETG1 60% EAA 15% 2.5 mic |
| Layer 2 Base layer b) | PET2 60% PETG1 40% 22.0 mic | PET2 60% PETG1 40% 17.3 mic | PET2 60% PETG1 40% 13.5 mic | PET2 60% PETG1 40% 22.0 mic | PET2 60% PETG1 40% 17.3 mic | PET2 60% PETG1 40% 24 mic |
| Layer 3 outer layer c) | PET2 98% PETG2 2% 6.5 mic | PET2 98% PETG2 2% 2.6 mic | PET2 98% PETG2 2% 2.0 mic | PET2 98% PETG2 2% 6.5 mic | PET2 98% PETG2 2% 2.6 mic | PET2 98% PETG2 2% 6.5 mic |

TABLE 2

|  | Film 7 | Film 8 | Film 9 |
|---|---|---|---|
| Total thickness | 33 mic. | 25 mic. | 17.5 mic. |
| Layer 1 Sealant layer a) | 60% PETG1 15% LLDPE-mod 25% PET1 2.5 mic. | 60% PETG1 15% LLDPE-mod 25% PET1 2.3 mic. | 60% PETG1 15% LLDPE-mod 25% PET1 2.0 mic. |
| Layer 2 Base layer b) | 60% PET1 40% PETG1 24.0 mic. | 60% PET1 40% PETG1 19.0 mic. | 60% PET1 40% PETG1 13.5 mic. |
| Layer 3 outer layer c) | 98% PET1 2% PETG2 6.5 mic. | 98% PET1 2% PETG2 3.7 mic. | 98% PET1 2% PETG2 2.0 mic. |

Films 1 to 9 were manufactured on tenterframe LISIM® line, according to the following methodology and conditions.

The three layers were coextruded through a three-layer feedblock and then distributed through a flat die, having a multimanifold system. The melt out of the die was quenched onto a chill roll; electrostatic pinning was used to favor the intimate contact between melt and chill roll. The so formed cast was then biaxially oriented. The stretching was done simultaneously, at orientation ratios of 3.6:1 in MD and of 3.8:1 in TD, and at temperature of 95° C. (preheating zones) and of 98° C. (stretching zones). Before oven exit, the film was annealed at temperature from 230° C. to 235° C. The bi-oriented film was finally cooled, edge trimmed and wound into mill logs.

Comparative Films

Mylar® OL is a dual ovenable biaxially oriented polyester film with an amorphous polyester heat-seal layer, by DuPont Teijin, commercially available in nominal 50, 75, 100 and 150 microns of thickness. No information are available on the polyester of the base layer.

Mylar CKPSE is an uncoated formable polyester film by DuPont Teijin designed for shallow-draw thermoformed dual-ovenable packages, also known as Mylar® COOK, designed to work with most roll stock thermoforming equipment. The polyesters are defined as Polyethylene Terephthalate Polymers.

Test Methods

The films used in the thermoforming methods of the invention and commercial comparative films were evaluated with the following test methods:

% Free shrink: was assessed both before and after thermoforming as explained below.

Free shrink % before thermoforming: square specimens of 12 cm×12 cm were cut from the film under test. On the surface of each specimen, a centered square of 10 cm×10 cm was sketched with a pencil.

The specimens were put in a laboratory oven, unrestrained, under air for 5 minutes at 180° C. The dimensional change of the sketched square of each sample was measured in both LD and TD directions.

The percent of free shrink was calculated, for each one of LD and TD directions, with the formula $$[(Lo-Lf)/Lo] \times 100$$

wherein Lo is the initial length of the film specimen in mm before the test and Lf is the length of the film specimen in mm after shrinking.

Total free shrink %: it is the sum of the free shrink % in LD and TD of the film sample measured as described above.

Free shrink % after thermoforming: square specimens of 7 cm×7 cm were cut from the bottom part of the thermoformed material under test. On the surface of each specimen, a centered square of 5 cm x 5 cm was sketched with a pencil.

The specimens were put in a laboratory oven, unrestrained, under air for 5 minutes at 180° C. The dimensional change of the sketched square of each sample was measured in both LD and TD directions.

The percent of free shrink was calculated, for each one of LD and TD directions, with the formula $$[(Lo-Lf)/Lo] \times 100$$

wherein Lo is the initial length of the film specimen in mm before the test and Lf is the length in mm of the film specimen after shrinking.

Max Shrink Tension: i.e. the force per original unit width developed by a film in the longitudinal (LD) or transverse (TD) direction at a specified temperature in its attempt to shrink, while under restraint, was measured by the following internal test method: a 25.4 mm wide strip of film was cut from the sample in the longitudinal or transverse direction. The force measurement was made by a load cell on which a camping jaw was connected. Opposed to this jaw, a second one on which the specimen was fixed, was adjusted in position by an external hand knob to pretension the specimen. The two jaws kept the specimen in the center of a channel into which an impeller blew heated air. In the air channels three thermocouples were fixed to measure the temperature. The temperature of the specimen, as measured by the thermocouples, was increased at a rate of about 2° C./second up to about 180° C. and the force was measured continuously. The measured force was then divided by the specimen original width to obtain the shrink force and further divided by the thickness of the film sample to give the shrink tension. Typically, the shrink tension was expressed in kg/cm$^2$.

Elastic Modulus: (at 23° C.) ASTM D882

Tensile strength and Elongation at break: (at 23° C.) ASTM D882

Haze: ASTM D1003

Gloss: ASTM D2457 (at 60°)

Tg and melting point: ASTM D3418

Formability: formability of the films was evaluated by visual inspection, looking for defects of the material in conforming to the mold shape and details, by measuring the thickness of the material in different parts of the thermoformed container and by assessing the volume of the cavity in line with the volume test described below.

Volume Test (Index of Shrinkage after Thermoforming)

This very simple test had the purpose of assessing the formability of a film and its shrinking back after thermoforming by measuring the actual volume of the cavity of the container made from that film by thermoforming, under specific conditions. The volume of the cavity of the thermoformed container was indirectly evaluated by measuring the weight of the water that is needed to fill in the thermoformed cavity up to the flange. The higher the weight of water, the higher is the volume of the cavity and, hence, the more formable the film is.

Accordingly, considering a water density of 1 g/cc, the difference of the volumes of the thermoformed cavity and of the mold expressed in percentage can be calculated as follows $$\Delta V\% = [(V\text{cavity} - V\text{mold})/V\text{mold}] \times 100 = [(Ww\text{cavity} - Ww\text{mold})/Ww\text{mold}] \times 100$$

in which V is the volume in cc and Ww is the weight of water that filled in either the cavity or the mold in grams.

Starting from the same mold and under the same thermoforming conditions, the more the material is formable, the more the percentage difference of the volumes tends to 0% as the volume of the cavity tends to the volume of the mold.

The test was carried out by thermoforming the material at the depth of 50 mm with a mold of dimensions: 135 mm×180 mm×50 mm with a T200 MULTIVAC machine (Heating plate above forming station, Heating Temperature 190° C., Heating Time: 2.5 sec, Forming Time: 2 sec).

This test was particularly useful for comparison purposes as, for a fixed mold and thermoforming conditions, it allowed to compare the actual formability of different materials simply by weighting the corresponding thermoformed containers filled with water.

Film Properties

Shrink, mechanical and optical properties of the films used in the methods of the present invention are collected in the following Table 3:

TABLE 3

| Property | Unity | Film 7 LD | Film 7 TD | Film 8 LD | Film 8 TD | Film 9 LD | Film 9 TD |
| --- | --- | --- | --- | --- | --- | --- | --- |
| Elastic Modulus | Kg/cm$^2$ | 22,000 | 24,000 | 23,000 | 25,000 | 23,000 | 24,000 |
| Tensile strength | Kg/cm$^2$ | 1600 | 1550 | 1650 | 1700 | 1650 | 1700 |
| Elongation at break | % | 115 | 120 | 105 | 105 | 105 | 105 |
| Haze | % | 9 | | 7 | | 5.5 | |
| Gloss | g.u. | 120 | | 120 | | 125 | |

These properties were measured according to the methods described above. Free shrink percentage and max shrink tension of the film 7 and of a commercial comparative thermoformable film (Mylar CKP5E) before and after thermoforming were evaluated with the test methods previously reported and collected in the following Table 4:

TABLE 4

| | Before thermoforming | | | | After thermoforming | | | |
| --- | --- | --- | --- | --- | --- | --- | --- | --- |
| | Film 7 (33 mic.) | | MYLAR CKP5E 50/200 (60 mic.) | | Film 7 (20 mic. at the bottom) | | MYLAR CKP5E 50/200 (30 mic. at the bottom) | |
| | LD | TD | LD | TD | LD | TD | LD | TD |
| Free shrink % 180° C. lab oven, air 5 min. | 6 | 4 | 3 | 1 | 32 | 23 | 21 | 19 |
| Max Shrink tension (at peak) Kg/cm2 | 76 | 75 | 239 | 159 | 57 | 40 | 105 | 81 |

Thermoforming was carried out on a T200 MULTIVAC machine, equipped with a mold of dimensions 135 mm×180 mm×50 mm, at the following operating conditions: Heating Temperature 180° C., Heating Time: 1.5 sec, Forming Time: 1.5 sec.

Example 1

Deep Drawing

The film 8 (25 microns) and the commercial comparative film Mylar®OL25 (25 microns) were thermoformed at the depth of 50 mm with a mold of dimensions: 135 mm×180 mm×50 mm, with a T200 MULTIVAC machine (Heating plate above forming station, Heating Temperature 190° C., Heating Time: 2.5 sec, Forming Time: 2 sec).

For both the materials, the drawing ratio was of 2.3.

The containers according to the invention were of uniform thickness, well defined and closely conformed to the details of the mold with negligible shrink back once removed from the mold.

The thicknesses of the films after thermoforming were evaluated on 10 samples for each film with the following results:

TABLE 5

| Thicknesses in microns | Film 8 Containers A Min-Max (theoretical mean value) | Mylar ®OL25 Containers B Min-Max (theoretical mean value) |
| --- | --- | --- |
| Bottom | 11-12 (11.5) | 10-15 (12.5) |
| Corner | 3 | 6 |
| Walls | 12 | 3-18 (10.5) |

The film formability was visually evaluated by the operator and judged much better for film 8. The features evaluated were the depth reached in the mold and how precisely the shape of the formed container corresponded to the shape of the mold, in terms of possible "shrink-back" effect and of "pouch definition".

As can be appreciated from the above data in Table 5, film 8 was formed smoothly with a much more homogeneous distribution (i.e. constant thickness) than the commercial film.

The variability of the thickness (calculated as percentage in respect of the theoretical mean value) for the containers A according to the invention is of about ±4.4% for the bottom and about 0% for the walls while for the comparative containers B of about ±20% for the bottom and of about ±71% for the walls.

Furthermore, film 8 conformed better to the shape of the mold, resulting in a cavity of higher volume, as confirmed by the following volume test (Index of shrinkage after thermoforming).

Ten of the above containers made from film 8 (A) and ten from Mylar®OL25 (B) were filled with water up to the flange and weighted. The mean weight of the filled containers A and B was of 905 g and 740 g respectively.

Considering that the mold dimensions were 135 mm×180 mm×50 mm, the maximum volume of the mold was 1215 cc, which corresponded to 1215 g of water. It follows that the difference in water weights (which corresponds to the difference of volumes ΔV) of the mold vs the formed container in percentage is −25% for container A according to the invention and −39% for comparative container B.

From these data, it appears that the film used in the present invention, characterized by the polyester having an intrinsic viscosity higher than 0.75 dl/g in the base layer b), had a better formability in comparison with the commercial polyester Mylar film of comparable thickness. Advantageously, the containers of the invention A had an increased packaging capacity compared to containers made of commercial polyester based films of same thickness B, with an evident improvement in terms of costs and carbon footprint.

Example 2

Deep Draw Thermoform-Shrink Method
Deep-Drawing Step

The film 7 (33 microns) and the commercial comparative films Mylar®OL25 (24 microns) and Mylar®OL40 (38 microns) purchased from DuPont Teijin Films were thermoformed at the depth of 50 mm to give rectangular containers C, D and E respectively with a T200 MULTIVAC machine, equipped with a mold of dimensions 135 mm×180 mm×50 mm, at the following operating conditions:

Heating Temperature 180° C., Heating Time: 1.5 sec, Forming Time: 1.5 sec.

For all the materials, the drawing ratio was of 2.3.

Pictures of the containers C, D and E are reported in FIG. 2.

As can be appreciated from these pictures, both the commercial films Mylar®OL25 and Mylar®OL40, while forming, did not acquire a satisfactory pouch definition: the walls were rounded, the material was wrinkled and it did not perfectly follow the design of the mold.

On the contrary, the film 7 had a very good definition under the same conditions: the material remained tense and plainly conformed to the walls of the mold and the volume of the cavity was visibly higher than those of the controls.

In conclusion, the formability of the tested materials was visually evaluated by the operator and judged to be much better for film 7 than for the commercial films Mylar®OL25 and Mylar®OL40.

Packaging and Shrinking Steps

Twenty containers for each type (C, D and E) were loaded with chicken legs, vacuumized and hermetically sealed at the temperature of 200° C. by using as top webs the same film of the bottom thus providing packages C, D and E.

Other twenty packages (for each material and for each temperature) were prepared under the same conditions described above but the sealing temperature, which was set at 185° C. and 220° C., thus providing packages C1, C2, D1, D2, E1 and E2 respectively.

All the sealed packages were then passed through a shrink tunnel (CJ61-CRYOVAC, belt speed 4.5 m/min at 180° C.) and shrunk.

The shrunk packages according to the invention (C, C1 and C2) were more tight and appealing, the material conformed better to the shape of the product with respect to the shrunk packages D, D1, D2 and E, E1, E2 made from commercial films.

The absence of wrinkles and the excellent optics of the packages according to the invention (C-C2) made these packages very attractive and easy to be visually inspected.

Example 3

Cooking Test

Ten packages for each type of package (C, C1, C2, D, D1, D2 and E, E1, E2) prepared as described under example 2 were kept in a ventilated conventional oven at 180° C. for 30 minutes. The packages were then taken out of the oven and evaluated by visual inspection for the following features:

hermeticity and self-venting: before cooking, the seal was hermetic with no leaks for all the packages tested. During cooking, thanks to the composition of the seal layer of the top, the packages C-C2 according to the invention opened for a limited length of the seal area allowing to relieve the internal pressure of the package (self-venting) but without an excessive escape of the internal moisture. On the contrary the packages D/E/D1/E1 made of the commercial film Mylar®OL25 and OL40 opened for a longer part of the seal and more of the baking liquids were so lost. The packages D2/E2 did not self-vent (seal too strong).

peelability: it was assessed 1-2 minutes after retrieving the packages from the oven. For packages according to the invention C-C2, removal of the top was easy and with a clean peel (no fringes or tears). The packages D, E, D1 and E1 were also easily opened as most of the seal already failed during cooking. Finally, the packages D2/E2 were more difficult to open.

cooked product appearance: the chicken legs of packages according to the invention C-C2 were well cooked and flavored, tender and juicy internally but browned (roasted) at surface. Considering the comparative packages D/E/D1/E1 made of the commercial film Mylar, that during cooking opened for a long part of the seal and lost more of the cooking liquids, the film browned and the cooked products were less juicy. Finally, the chicken legs of packages D2/E2 were pale and not roasted.

The relevant features of the tested packages and the observations of the operators are summarized in the following Table 6:

TABLE 6

|  | film 7 | film 7 | film 7 | Mylar ® OL25/OL40 | Mylar ® OL25/OL40 | Mylar ® OL25/OL40 |
| --- | --- | --- | --- | --- | --- | --- |
| Package | C1 | C | C2 | D1/E1 | D/E | D2/E2 |
| Seal T ° C. | 185 | 200 | 220 | 185 | 200 | 220 |
| Hermeticity before cooking | yes | yes | yes | yes | yes | yes |
| Package cooking behavior | Self-venting | Self-venting | Self-venting | Self-venting | Self-venting | Did not open |
| Product appearance after cooking | brown | brown | brown | brown | brown | pale |

The same cooking test was repeated at 200° C. and 220° C. with comparable results regarding hermeticity, self-venting, peelability and cooked product appearance.

Example 4

Sausages were packed in thermoformed-shrunk packages in which the same film was used as top and as bottom, in particular film 8 for the packages according to the present invention and the commercial film Mylar®OL25 for comparative packages.

The thermoforming of the bottom web was carried out according to the following conditions: T200 MULTIVAC machine, at 190° C., 2.5 sec heating time, 2.0 sec forming time with a depth of 50 mm (mold dimensions: 135 mm×180 mm×50 mm). The sausages were loaded into the cavity, the opening closed under vacuum by sealing the same respective top web (Film 8 or Mylar) at 200° C. (sealing time: 2 sec.). The packages were shrunk in air in a shrink tunnel CRYOVAC CJ-61 at 180° C., at a belt speed of 6 m/min.

Pictures of these packages, after vacuum sealing and after shrinking, are reported in FIGS. 4 and 5.

Figures 4A, 4B:
FIG. 4 is a picture of a sausages thermoformed package according to the invention (FIG. 4A, left) and of a comparative package (FIG. 4B, right) before shrinking.

As can be appreciated from FIGS. 4A and 4B, the package according to the invention 4A was more tight and with no or very few wrinkles, even before shrink as the film conformed better to the product contour notwithstanding the higher volume of the thermoformed cavity. In fact, as demonstrated above —see Ex. 1—the film for the present thermoforming packaging method was more formable than the comparative film Mylar providing a larger thermoformed cavity.

The difference in appearance was even more evident when considering the shrunk packages of FIGS. 5A and 5B: the shrunk film of the package according to the invention 5A remained tense and without wrinkles, while the film of comparative package 5B did not conform well and remained creased.

The absence of air pockets inside the package 5A is particularly appreciated as it may prolong the shelf life of the product because it avoids the presence of residual oxygen, which causes oxidative degradation and the accumulation of liquids, potential culture media for bacterial growth. Furthermore, the package according to the invention is much more appealing than the comparative package.

In conclusion, the thermoformed packages according to the invention are characterized by deep drawn containers, which conformed very well to the mold, resulting in an increased packaging capacity—for equal thickness and amount of material—compared to commercial polyester based materials.

In the shrinkable version, the present packages were more attractive with a tight film without wrinkles. Furthermore, the present packages are suitable for re-heating and cook-in food in a microwave, conventional and convection ovens, show good hermeticity, clean peelability, self-venting and very good optics.

The invention claimed is:

1. A thermoforming food packaging method, for the manufacture of a dual ovenable thermoformed package, which comprises
providing a thermoformable dual ovenable biaxially oriented polyester film as bottom web, forming the bottom web thus providing at least a cavity with an opening;
placing a food product in the cavity through the opening;
closing the cavity at the opening either by hermetically sealing the bottom web to itself or by providing a dual ovenable top web and hermetically sealing the dual ovenable top web to the bottom web, all around the opening; and
cutting out the sealed package,
characterized in that the film of the bottom web comprises:
an outer heat sealable polyester layer a),
an inner polyester base layer b), comprising a polyester having an intrinsic viscosity (IV) measured according to ASTM D4603-03 higher than 0.75 dl/g,
an outer polyester layer c), and
i) the bottom web is formed at a draw ratio higher than 1.26 or
ii) the film of the bottom web is heat-shrinkable and the sealed package is finally heat-shrunk.

2. The packaging method of claim 1 wherein i) the bottom web is formed at a draw ratio higher than 1.26 and ii) the film of the bottom web is heat-shrinkable and the sealed package is finally heat-shrunk.

3. The packaging method according to claim 1 wherein the film of the bottom web consists of an outer heat sealable polyester layer a), an inner polyester base layer b), comprising a polyester having an intrinsic viscosity (IV) measured according to ASTM D4603-03 higher than 0.75 dl/g, and an outer polyester layer c).

4. The packaging method according to claim 1 wherein the step of closing the cavity at the opening is carried out under vacuum.

5. The packaging method according to claim 1 wherein the total thickness of said film, before thermoforming, is lower than 50 microns.

6. The packaging method according to claim 1 wherein said thermoforming food packaging method is a deep-drawing packaging method in which the draw ratio is higher than 2.0.

7. The packaging method according to claim 1 wherein said method is a thermoform-shrink packaging method, in which the film of the bottom web has a free shrink percentage, before thermoforming, in at least one of LD or TD directions of at least 3% measured according to the test method reported in the description.

8. The packaging method according to claim 1 wherein the film of the bottom web is further characterized by
a tensile strength of at least 1500 Kg/cm$^2$ in at least one of LD or TD directions, and/or
an elongation at break of at least 100% in at least one of LD or TD directions, and/or
an elastic modulus of at least 20,000 Kg/cm$^2$ in at least one of LD or TD directions, all these properties being measured at 23° C. according to ASTM D882.

9. The packaging method according to claim 1 wherein the polyester of the base layer b) of the film of the bottom web has an intrinsic viscosity (IV) of at least 0.8 dl/g.

10. The packaging method according to claim 1 wherein the film of the bottom web comprises
the outer heat sealable layer a) comprising
from about 25% to 70% by weight of at least a first amorphous polyester having a melting temperature not higher than the melting temperature of the polyester of the base layer b), from 10% to 20% by weight of at least a thermoplastic resin selected from polyamides, polystyrenes, polyethylenes, ionomers, ethylene/unsaturated carboxylic acid copolymers, ethylene/unsaturated esters copolymers, ethylene/propylene copolymers, maleic anhydride-modified polyethylenes and ethylene/cyclic olefin copolymers, preferably a maleic anhydride-modified polyethylene, and
from 20% to 60% by weight of at least a further polyester characterized by an intrinsic viscosity of at least 0.75 dl/g or higher and/or by a glass transition temperature Tg not higher than 80° C. and/or a melting point higher than 240° C., measured according to ASTM D3418; and/or
the inner polyester base layer b) comprising an admixture of at least 50% of a polyester resin having an intrinsic viscosity higher than 0.75 dl/g, and at most 50% of an amorphous polyester; and/or
the outer polyester layer c) comprising a polyester characterized by an intrinsic viscosity of at least 0.75 dl/g or higher and/or by a glass transition temperature Tg not higher than 80° C. and/or a melting point higher than 240° C., measured according to ASTM D3418.

11. The packaging method according claim 1 wherein the film of the bottom web consists of
the outer heat sealable layer a) consisting of
from about 40% to 70% by weight of at least a first amorphous polyester having a melting temperature not higher than the melting temperature of the polyester of the base layer b),
from 10% to 20% by weight of at least a thermoplastic resin selected from ethylene/unsaturated carboxylic acid copolymers, ethylene/unsaturated esters copolymers and maleic anhydride-modified polyethylene and
from 20% to 50% by weight of at least a further polyester characterized by an intrinsic viscosity of at least 0.75 dl/g or higher and/or by a glass transition temperature Tg not higher than 80° C. and/or a melting point higher than 240° C.; and
the inner polyester base layer b) consisting of an admixture of at least 55% of a polyester resin having an intrinsic viscosity higher than 0.75 dl/g and at most 45% of an amorphous polyester; and
the outer polyester layer c) comprising at least 95% of the same polyester of the base layer b), characterized by an intrinsic viscosity of at least 0.75 dl/g.

12. The packaging method according to claim 1 wherein, in the film of the bottom web, the base layer b) comprises the same amorphous polyester of the heat-sealable layer a) and/or the polyester of the outer polyester layer c) is the same polyester of the base layer b) having an intrinsic viscosity higher than 0.75 dl/g.

13. The packaging method according to claim 1 wherein the film of the bottom web is a coextruded film.

14. A dual ovenable thermoformed flexible container, made by thermoforming a biaxially oriented polyester film as bottom web, the film of the bottom web comprises:
an outer heat sealable polyester layer a),
an inner polyester base layer b), comprising a polyester having an intrinsic viscosity (IV) measured according to ASTM D4603-03 higher than 0.75 dl/g,
an outer polyester layer c) said container comprising a thermoformed cavity and an opening, in which the depth of the thermoformed cavity is higher than 1 cm and the thermoformed container is heat-shrinkable.

15. The flexible container according to claim 14 wherein the thermoformed film has a total free shrink percentage, after thermoforming, of at least 40% measured according to the test method reported in the description.

16. The flexible container according to any one of claim 14 wherein the container further comprises a flange surrounding the opening, suitable to be sealed to a dual ovenable top web.

17. A dual ovenable hermetic thermoformed package comprising
a dual ovenable thermoformed flexible container according to claim 14 comprising a thermoformed cavity and an opening,
a food product placed in the cavity,
the opening being hermetically closed either by the flexible container self-sealed at the opening or by a dual ovenable top web sealed to the container all around the opening.

18. The package according to claim 17, which is a vacuum package and at least the flexible container is heat shrunk.

19. The package according to claim 17 wherein the flexible container and the top web are made of the same film.

20. A method for cooking a food product, which comprises
providing a dual ovenable thermoformed package made by thermoforming a biaxially oriented polyester film as bottom web, the film of the bottom web comprises:
an outer heat sealable polyester layer a),
an inner polyester base layer b), comprising a polyester having an intrinsic viscosity (IV) measured according to ASTM D4603-03 higher than 0.75 dl/g,
an outer polyester layer c) i) the bottom web is formed at a draw ratio higher than 1.26 or ii) the film of the bottom web is heat-shrinkable and the sealed package is finally heat-shrunk hermetically enclosing said food product and
cooking the packaged food product in said package in a microwave or in a conventional oven.

* * * * *